(12) United States Patent
Imamura et al.

(10) Patent No.: US 9,010,916 B2
(45) Date of Patent: Apr. 21, 2015

(54) INK COMPOSITION, INK SET, AND IMAGE FORMING METHOD

(75) Inventors: Mika Imamura, Kanagawa (JP); Misato Sasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 94 days.

(21) Appl. No.: 13/591,584

(22) Filed: Aug. 22, 2012

(65) Prior Publication Data

US 2013/0050355 A1 Feb. 28, 2013

(30) Foreign Application Priority Data

Aug. 31, 2011 (JP) ................................ P2011-189991

(51) Int. Cl.
| | | |
|---|---|---|
| *B41J 2/01* | (2006.01) | |
| *C09D 11/322* | (2014.01) | |
| *B41J 2/21* | (2006.01) | |
| *B41J 11/00* | (2006.01) | |
| *C09D 11/101* | (2014.01) | |
| *C09D 11/40* | (2014.01) | |
| *C09D 11/54* | (2014.01) | |

(52) U.S. Cl.
CPC ............. *C09D 11/322* (2013.01); *B41J 2/2107* (2013.01); *B41J 11/002* (2013.01); *C09D 11/101* (2013.01); *C09D 11/40* (2013.01); *C09D 11/54* (2013.01)

(58) Field of Classification Search
CPC .......... B41J 2/01; B41J 11/002; B41J 2/2114; B41J 2/2107; C09D 11/322; C09D 11/54; C09D 11/101; C09D 11/40
USPC ........ 347/21, 28, 95–100, 102; 523/160, 161; 106/31.13, 31.6
See application file for complete search history.

(56) References Cited

U.S. PATENT DOCUMENTS

| | | | |
|---|---|---|---|
| 2005/0176877 A1* | 8/2005 | Miyabayashi | ................. 524/556 |
| 2009/0117349 A1* | 5/2009 | Saito et al. | ................. 428/195.1 |
| 2009/0239981 A1 | 9/2009 | Morimoto | |
| 2010/0075052 A1 | 3/2010 | Irita | |
| 2010/0080913 A1 | 4/2010 | Irita | |
| 2011/0102529 A1 | 5/2011 | Yoshida et al. | |
| 2011/0205289 A1 | 8/2011 | Irita et al. | |
| 2011/0211013 A1 | 9/2011 | Matsumoto et al. | |
| 2013/0050364 A1* | 2/2013 | Imamura et al. | ............... 347/100 |

FOREIGN PATENT DOCUMENTS

| | | |
|---|---|---|
| JP | 2006-176623 A | 7/2006 |
| JP | 2011-105826 A | 7/2006 |
| JP | 2008-156524 A | 7/2008 |
| JP | 2009-46595 A | 3/2009 |
| JP | 2009-102454 A | 5/2009 |
| JP | 2009-227719 A | 10/2009 |
| JP | 2009-275125 A | 11/2009 |
| JP | 2010-70693 A | 4/2010 |
| JP | 2010-274476 A | 12/2010 |

OTHER PUBLICATIONS

Japanese Office Action dated Aug. 27, 2013 for Japanese Application No. 2011-189991 with English translation.
Notice of Reasons for Rejection dated Aug. 27, 2013 for Japanese Application No. 2011-189990 with English translation.
U.S. Office Action dated Feb. 14, 2014 for corresponding U.S. Appl. No. 13/586,168.

* cited by examiner

*Primary Examiner* — Matthew Luu
*Assistant Examiner* — Rut Patel
(74) *Attorney, Agent, or Firm* — Birch, Stewart, Kolasch & Birch, LLP

(57) ABSTRACT

An ink composition of the present invention includes: cross-linked particles containing a quinacridone solid solution pigment including at least two types of quinacridone-based compound; a water-soluble polymerizable compound; a polymerization initiator; and water. By selectively using cross-linked solid solution pigments as pigments (colorants), along with excellent adhesion of the image, the stability over time of the ink composition itself is excellent.

11 Claims, No Drawings

INK COMPOSITION, INK SET, AND IMAGE FORMING METHOD

BACKGROUND OF THE INVENTION

1. Field of the Invention

The present invention relates to an ink composition, an ink set, and an image forming method.

2. Description of the Related Art

In recent years, various materials have been used as media for ink jet recording, for example, as well as dedicated ink jet paper, media for printing such as commercially available plain paper, high-quality paper, coated paper, and art paper, have come into use. Whichever material is to be recorded upon, there is a demand for high-grade image quality.

Also, in such cases as using plain paper and printing media, a pigment is preferable as an ink coloring material capable of forming a highly robust image having water resistance and light resistance and the like. Among inks including pigments, there is interest in water-based pigment inks from the viewpoints of cost and the global environment or the safety of business environment and the like. Among these, as magenta pigment for ink jet applications, quinacridone-based pigments have been suitably used.

As water-based ink for ink jet recording, there is disclosed an aqueous dispersion of water-insoluble vinyl polymer particles containing quinacridone-based pigments such as C.I. Pigment Red 122 and/or C.I. Pigment Violet 19 and a pigment derivative having a quinacridone skeleton in which an acidic group has been introduced into an organic pigment (for example, refer to JP2006-176623A). Further, there is disclosed a water-based ink containing a quinacridone solid solution pigment contained in cross-linked polymer particles (for example, refer to JP2009-275125A). However, the ink cannot be stably maintained in these configurations.

In consideration of the above-described situation, there is disclosed an aqueous ink for ink jet recording containing a quinacridone solid solution pigment including two types or more of quinacridone compounds and including cross-linked polymer particles having an anionic group neutralized with a base (for example, refer to JP2009-46595A). According to the literature, the chroma is increased and the storage stability is improved.

In addition, there is disclosed aqueous active energy ray-curable ink containing a water-soluble photopolymerizable material undergoing radical polymerization, a specific water-soluble photopolymerization initiator, and an anionic aqueous pigment dispersion (for example, refer to JP2009-102454A). Further, there is disclosed an aqueous ink composition including a water-soluble polymerizable compound, a photopolymerization initiator, and a water-insoluble coloring material (for example, refer to JP2011-105826A), and a quinacridone solid solution pigment may be exemplified as such a water-insoluble coloring material.

SUMMARY OF THE INVENTION

As described above, in particular, the magenta pigment is generally known to have a narrow color reproduction range and quinacridone-based pigments, which are one type thereof, are no exception. For this reason, there is interest in the improvement of the chroma through the use of a quinacridone solid solution pigment in which two types or more of quinacridone compounds are dissolved. However, in non-curable compositions such as the aqueous inks as disclosed in JP2006-176623A and JP2009-275125A, even if stability can be maintained to a certain extent, in a system in which initiator components and monomer components exhibiting a comparatively hydrophobic property are present, it is by nature difficult to stably maintain the dispersibility of a solid solution pigment having poor dispersion stability in the water-based medium for a long time using only the techniques of the above-described related art.

Further, since magenta pigments such as quinacridone-based pigments generally have a narrow color reproduction range, large amounts must be included when trying to reproduce a desired hue. However, there is also a problem in that, in a system configured to be ultraviolet curable or the like while containing pigment up to certain concentration level, the ultraviolet rays or the like do not reach the deep portion of the landed ink droplets and, as a result, the curing is poor and the adhesion to the recording medium of the image is deteriorated.

In consideration of the above, the present invention has an object of providing an ink composition and ink set having excellent stability over time and image adhesion to a recording medium and an image forming method forming an image having excellent adhesion to a recording medium, and realizes the object.

Specific means for realizing the above object are as below.

<1> An ink composition including: cross-linked particles in which at least a part of a quinacridone solid solution pigment including at least two types of quinacridone compound is coated with cross-linked resin; a water-soluble polymerizable compound; a polymerization initiator; and water.

<2> The ink composition according to <1> in which the ratio of the cross-linked particles (q) and the polymerizable compound (p) [q:p[mass ratio]] is 1:1 to 1.20

<3> The ink composition according to <1> or <2> in which the quinacridone solid solution pigment is at least one of a solid solution pigment of unsubstituted quinacridone and dimethyl-substituted quinacridone, and a solid solution pigment of unsubstituted quinacridone and dichloro-substituted quinacridone.

<4> The ink composition according to any one of <1> to <3> in which the polymerizable compound is represented by the following general formula (1). In the following general formula (1), Q represents a n valent group and $R^1$ represents a hydrogen atom or a methyl group. n represents an integer of 1 or more.

[Chem. 1]

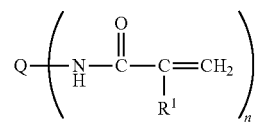

General formula (1)

<5> An ink set including the ink composition according to one of any of <1> to <4>, and a treatment liquid including an aggregation component causing the ink composition to aggregate when in contact with the ink composition.

<6> The ink set according to <5> in which the aggregation component is an acidic compound.

<7> An image forming method having an ink applying step for forming an image by applying the ink composition according to one of any of <1> to <4> to the recording medium through an ink jet method.

<8> Further, the image forming method according to <7> having a treatment liquid applying step of applying a treatment liquid including an aggregation component causing the ink composition to aggregate when in contact with the ink composition, to the recording medium.

The present invention provides an ink composition and ink set having excellent stability over time and image adhesion to a recording medium. In addition, the present invention provides an image forming method forming images with excellent adhesion to a recording medium.

DESCRIPTION OF THE PREFERRED EMBODIMENTS

Below, the ink composition and ink set of the present invention and the image forming method using these will be described in detail.

<Ink Composition>

The ink composition of the present invention has a curable configuration using (1) cross-linked particles in which at least a part of a quinacridone solid solution pigment including at least two types of quinacridone compound is coated with cross-linked resin, (2) a water-soluble polymerizable compound, (3) a polymerization initiator, (4) and water.

The ink composition of the present invention may be configured to further include a water-soluble organic solvent, a surfactant, other additives, or the like as necessary.

For example, Pigment Red 122 or the like, which is a magenta pigment, is generally known to have a narrow color reproduction range when used alone and methods such as combining a plurality of pigments have been employed. Among these, a solid solution pigment formed by two types or more of pigments is considered to be useful from the viewpoint of ensuring a wide color reproduction range. However, the solid solution pigment falls off easily even if the surface thereof is covered with a dispersed polymer, thus, it is difficult to bring about stable dispersion in an aqueous medium. In particular, when attempting to obtain a curable configuration including a monomer component and an initiator component exhibiting comparatively hydrophobic properties, the dispersibility of the solid solution pigments tend to further deteriorate due to the hydrophobic nature of these components. On the other hand, since magenta pigments such as quinacridone-based pigments have a narrow color reproduction range, they are often used in comparatively large amounts in comparison with pigments of other colors; however, if the concentration becomes very high, the curing reaction due to the irradiation becomes insufficient. Meanwhile, the solid solution pigment has an advantage compared to a single pigment in that the particles can be made smaller and the pigment concentration can be reduced. That is, since the pigment concentration can be reduced by using the solid solution pigment, there is an advantage in curable inks cured using ultraviolet rays or the like in terms of the curing principle.

In consideration of these circumstances, in the present invention, in a case where a curable ink composition including a polymerizable compound and a polymerization initiator is obtained, the pigment particles are suppressed to be small and the pigment concentration is reduced by dispersing and including cross-linked particles including a solid solution pigment as a pigment component. As a result, favorable curing sensitivity in which the ultraviolet rays or the like penetrate to the deep portion of the ink is obtained and, furthermore, the adhesion of the image is excellent.

Further, the solid solution pigment generally has a poor dispersibility and poor stability in an aqueous medium and there is a tendency for the stability to further worsen in the presence of monomer components or initiator components; however, since the dispersed polymer does not easily fall off from the surface of the solid solution pigment in the cross-linked particles including the solid solution pigment, dispersion may be stably performed in an aqueous medium over a long period. Accordingly, while maintaining favorable curability using the solid solution pigment in the presence of monomer components and initiator components, the stability of the ink composition over time is improved.

Below, description will be given of constituent elements of the ink composition of the present invention.

—Cross-Linked Particles—

The ink composition of the present invention contains at least one type of cross-linked particles, in which at least a part of a quinacridone solid solution pigment including at least two types of quinacridone compound is coated with cross-linked resin. The quinacridone solid solution pigment generally has poor dispersibility in a water-based medium in comparison with a single magenta pigment; however, by performing the cross-linking, the dispersibility and the stability thereof are improved.

The cross-linked particles in the present invention are cross-linked particles in which a polymer of polymer particles containing a quinacridone solid solution pigment are cross-linked.

(Quinacridone Solid Solution Pigment)

The quinacridone solid solution pigment is obtained by solid-solutioning two or more types of quinacridone compound. The magenta pigments generally have a narrow color reproduction range and the quinacridone-based pigment does not always have a sufficient color reproduction range. For this reason, the quinacridone solid solution pigment is used from the viewpoint of widening the color reproduction range even though the dispersibility is inferior. The quinacridone solid solution pigment has excellent color tone and exhibits a favorable color reproduction range, as well as various physical properties such as weather resistance, solvent resistance, and the like.

As the solid solution pigment, a solid mixture becoming a single phase, in a state of equilibrium, by putting one of two types or more of pigments or a compound having skeleton similar to a pigment into the structure of another in a physically and chemically stable state, or ones in which a crystal body is dissolved into another type of crystal body may be considered. Specifically, for example, a pigment existing as a mixed crystal of a plurality of pigment molecules may be exemplified. Accordingly, the solid solution pigment was distinguished from ones in which two types or more of pigments are simply mixed.

As the quinacridone-based compound, compounds represented by the following general formula (A) may be exemplified.

$$X_n\text{-}Q\text{-}Y_m \tag{A}$$

In the general formula (A), Q represents a quinacridone residue or a quinacridone quinone residue. X and Y each independently represent a hydrogen atom, a methyl group, a chloro group, or a methoxy group, and m and n each independently represent an integer of 1 to 4.

As specific examples of the quinacridone-based compound represented by the general formula (A), unsubstituted quinacridone, 2,9-dimethyl quinacridone, 2,9-dichloro quinacridone, 2,9-dimethoxy quinacridone, 3,10-dimethyl quinacridone, 3,10-dichloro quinacridone, 3,10-dimethoxy quinacridone, 4,11-dimethyl quinacridone, 4,11-dichloro quinacridone, 4,11-dimethoxy quinacridone, quinacridone quinones and the like, may be exemplified.

As suitable examples of the quinacridone solid solution pigment, from the viewpoints of hue and color reproduction range, a solid solution pigment including at least two kinds selected from a group consisting of unsubstituted quinacridone, dimethyl-substituted quinacridone, and dichloro-substituted quinacridone may be exemplified. More specifically, for the same reason, (1) a solid solution pigment of unsubstituted quinacridone and dimethyl-substituted quinacridone (Example: 2,9-dimethyl quinacridone or the like), (2) a solid solution pigment of unsubstituted quinacridone and dichloro-substituted quinacridone (Example: 2,9-dichloro quinacridone, 3,10-dichloro quinacridone or the like), (3) a solid solution pigment of dim ethyl-substituted quinacridone (Example: 2,9-dimethyl quinacridone or the like), and dichloro-substituted quinacridone (Example: 2,9-dichloro quinacridone, 3,10-dichloro quinacridone or the like), and the like may be exemplified.

Among the above, from the viewpoints of hue and color reproduction range, (1) a solid solution pigment of unsubstituted quinacridone and dimethyl-substituted quinacridone and (2) a solid solution pigment of unsubstituted quinacridone and dichloro-substituted quinacridone are preferable. More specifically, from the viewpoint of hue, a solid solution pigment of unsubstituted quinacridone (C.I. Pigment Violet 19 or the like) and 2,9-dimethyl quinacridone (C.I. Pigment Red 122 or the like), and a solid solution pigment of unsubstituted quinacridone (C.I. Pigment Violet 19 or the like) and 2,9-dichloro-substituted quinacridone (C.I. Pigment Red 202 or the like), are preferable. In addition, a solid solution pigment of unsubstituted quinacridone (C.I. Pigment Violet 19 or the like) and 2,9-dichloro-substituted quinacridone (C.I. Pigment Red 202 or the like), is preferable.

Here, as the unsubstituted quinacridone, it is possible to use any of α-type, β-type, and γ-type; however, from the viewpoint of storage stability, β-type, and γ-type unsubstituted quinacridone are preferable. For example, the solid solution magenta pigment disclosed in JP1998-219166A (JP-H10-219166A) can also be used.

In the quinacridone solid solution pigment, from the viewpoints of the ejection reliability, image density, chroma, and the like of the ink composition, the mass ratio of unsubstituted quinacridone/dimethyl-substituted quinacridone, the mass ratio of unsubstituted quinacridone/dichloro-substituted quinacridone, and the mass ratio of dimethyl-substituted quinacridone/dichloro-substituted quinacridone are preferably 5/95 to 95/5, and more preferably 10/90 to 90/10.

The quinacridone solid solution pigment can be manufactured using known methods.

For example, (i) a method of dissolving the crude unsubstituted quinacridone and quinacridone-based compound in the presence of caustic alkali in a non-proton-based polar organic solvent and performing neutralizing and reprecipitating with acid (for details, reference can be made to the disclosure of JP1985-35055A (JP-S60-35055A)), (ii) a method of grinding the quinacridone compound of the crude or auxiliary pigment in the presence of alcohol and a base of a soluble quantity and isolating the resulting solid solution (for details, reference can be made to the disclosure of JP1990-38463A (JP-H02-38463A)), and (iii) a method of performing a pigmentation treatment (control of crystal form, size, and crystal type) after performing cyclocondensation on two or more kinds of 2,5 diarylamino terephthalic acid derivatives (for details, reference can be made to the disclosure of JP1998-219166A (JP-H10-219166A)), and the like may be exemplified.

The form of the quinacridone solid solution pigment may be any of dry pigments in the form of powder, granules, or lumps, or may be a wet cake or slurry.

In addition, from the viewpoint of storage stability, the average particle diameter of the quinacridone solid solution pigment is preferably 0.01 to 0.3 μm, and more preferably 0.03 to 0.2 μm. Here, the average particle diameter is a value determined from the average value of the major axis of 100 pigments by image analysis (20,000 times) using an electron microscope (TEM).

The confirmation of the solid solution pigment is possible using X-ray diffraction analysis. In other words, the crystal of the solid solution pigment shows a unique diffraction pattern, which is different to the X-ray diffraction pattern of a simple pigment mixture. The X-ray diffraction patterns in the simple pigment mixture are patterns corresponding to the superposition of the respective X-ray diffraction patterns of the pigments and the peak intensity thereof is proportional to the combination ratio of the plurality of pigments. From this, it is possible to distinguish the solid solution pigment from a simple pigment mixture.

(Cross-Linked Polymer)

In the cross-linked particles in the present invention, a cross-linked polymer containing a quinacridone solid solution pigment is preferably a cross-linked polymer in which a polymer is cross-linked with a cross-linking agent, and the polymer is preferably a water-insoluble polymer.

The water-insoluble polymer refers to a polymer where, when the polymer is dissolved in 100 g of water at 25° C. after being dried for 2 hours at 105° C., the dissolved amount thereof is 10 g or less, preferably 5 g or less and more preferably 1 g or less. When the polymer has a salt-forming group, according to the type thereof, this dissolved amount is the dissolved amount at the time of 100% neutralization of the salt-forming group of the polymer by acetic acid or sodium hydroxide.

As the polymer, polyester, polyurethane, vinyl-based polymer and the like may be exemplified and, from the viewpoint of storage stability, a vinyl-based polymer (below referred to as a vinyl polymer) obtained by the addition polymerization of vinyl monomers (a vinyl compound, a vinylidene compound, and a vinylene compound) is preferable.

As the vinyl polymer, a vinyl polymer obtained by copolymerizing a monomer mixture including (a) a salt-forming group-containing monomer (component a), (b) a macromer (component b) and/or (c) a hydrophobic monomer (component c) is preferable. This vinyl polymer has a constituent unit derived from component a, a constituent unit derived from component b, and/or a constituent unit derived from component c. A more suitable vinyl polymer has a constituent unit derived from component a, or a constituent unit derived from component a and component c as the main chain, and is a water-insoluble vinyl graft polymer having a constituent unit derived from component b as a side chain.

(a) Salt-Forming Group-Containing Monomer

The salt-forming group-containing monomer improves the storage stability of the obtained dispersion. As the salt-forming group, a carboxy group, a sulfonic acid group, a phosphoric acid group, an amino group, an ammonium group or the like may be exemplified.

As salt-forming group-containing monomers, cationic monomers, anionic monomers, and the like disclosed in paragraph 0022 and the like of JP1997-286939A (JP-H09-286939A) may be exemplified.

As representative examples of the cationic monomers, an unsaturated amino-containing monomer, an unsaturated ammonium salt-containing monomer, and the like, may be exemplified. Among these, N,N-dimethyl amino ethyl(meth)acrylate, N—(N',N'-dimethyl-aminopropyl) (meth)acrylamide, and vinylpyrrolidone are preferable.

As representative examples of the anionic monomers, an unsaturated carboxylic acid monomer, an unsaturated sulfonic acid monomer, an unsaturated phosphoric acid monomer, and the like, may be exemplified. As the unsaturated carboxylic acid monomers, acrylic acid, methacrylic acid, crotonic acid, itaconic acid, maleic acid, fumaric acid, citraconic acid, 2-methacryloyloxy methyl succinic acid and the like may be exemplified. As the unsaturated sulfonic acid monomers, a styrene sulfonate, a 2-acrylamide-2-methylpropane sulfonate, a 3-sulfopropyl(meth)acrylate, a bis-(3-sulfopropyl)-itaconate ester, or the like may be exemplified. As the unsaturated phosphoric acid monomers, vinylphosphonic acid, vinyl phosphate, bis(methacryl oxyethyl) phosphate, diphenyl-2-acryloyloxyethylphosphate, diphenyl-2-methacryloyloxyethylphosphate, dibutyl-2-acryloyloxyethylphosphate, and the like may be exemplified. In the anionic monomers, from the viewpoints of storage stability and ejection stability, an unsaturated carboxylic acid monomer is preferable, and acrylate and methacrylate are more preferable.

(b) Macromer

Macromers improve the storage stability of the cross-linked polymer particles containing the quinacridone solid solution pigment. As the macromers, macromers which are monomers having a polymerizable unsaturated group for which a preferable number average molecular weight is 500 to 100,000 (more preferably 1,000 to 10,000) may be preferably exemplified. In addition, the number average molecular weight of the macromers is measured using polystyrene as a standard substance by a gel chromatography method using chloroform containing dodecyl dimethyl amine of 1 mmol/L as a solvent.

In the macromers, from the viewpoint of storage stability and the like of the cross-linked polymer particles containing a quinacridone solid solution pigment, and using one type or two types or more selected from a group consisting of a styrene-based macromer, an aromatic group-containing (meth)acrylate-based macromer, and a silicone-based macromer having a polymerizable functional group at one end is preferable.

As the styrene-based macromers, a styrene-based monomer homopolymer, or a copolymer of the styrene-based monomer with another monomer may be exemplified. As the styrene-based monomers, styrene, 2-methyl styrene, vinyl toluene, ethyl vinyl benzene, vinyl naphthalene, chlorostyrene and the like may be exemplified.

As the aromatic group-containing (meth)acrylate-based macromers, an aromatic group-containing (meth)acrylate homopolymer, or a copolymer with this and another monomer may be exemplified. The aromatic group-containing (meth)acrylate is (meth)acrylate having an aryl alkyl group which may have a substituent containing a hetero atom, 7 to 22 carbon atoms, preferably 7 to 18 carbon atoms, and more preferably 7 to 12 carbon atoms, or an aryl group which may have a substituent containing a hetero atom, 6 to 22 carbon atoms, preferably 6 to 18 carbon atoms, and more preferably 6 to 12 carbon atoms. As the substituent containing a hetero atom, a halogen atom, an ester group, ether group, hydroxy group or the like may be exemplified. For example, benzyl (meth)acrylate, phenoxyethyl(meth)acrylate, 2-hydroxy-3-phenoxy propyl acrylate, 2-methacryloyloxy ethyl-2-hydroxypropyl phthalate and the like may be exemplified, and, in particular, benzyl(meth)acrylate is preferable.

In addition, as the polymerizable functional group present at one end of the macromers thereof, acryloyloxy groups or methacryloyloxy groups are preferable, and, as other copolymerized monomers, acrylonitrile and the like are preferable.

The content amount of the styrene-based monomer in the styrene-based macromer or the aromatic group-containing (meth)acrylate in the aromatic group-containing (meth)acrylate-base macromer is preferably 50 mass % or more and more preferably 70 mass % or more from the viewpoint of improving the affinity to the pigment.

The macromer may be one having a side chain consisting of other constituent units such as an organopolysiloxane. For example, this side chain can be obtained by copolymerizing a silicone-based macromer represented by the following formula (2) and having a polymerizable functional group at one end.

(2)

[In the formula, t represents a number of 8 to 40.]

As styrene-based macromers which may be obtained commercially as component b, for example, AS-6 (S), AN-6 (S), HS-6 (S), and the like (trade names) manufactured by Toagosei Co., Ltd., may be exemplified.

(c) Hydrophobic Monomer

The hydrophobic monomer can improve the image density. As the hydrophobic monomers, an alkyl (meth)acrylate, an aromatic group-containing monomer, and the like, may be exemplified.

As the alkyl (meth)acrylate, one having an alkyl group with 1 to 22 carbon atoms, preferably 6 to 18 carbon atoms, is preferable, for example, methyl(meth)acrylate, ethyl(meth)acrylate, (iso)propyl (meth)acrylate, (iso or tertiary) butyl (meth)acrylate, (iso)amyl (meth)acrylate, cyclohexyl(meth)acrylate, 2-ethylhexyl(meth)acrylate, (iso)octyl (meth)acrylate, (iso)decyl (meth)acrylate, (iso)dodecyl (meth)acrylate, (iso)stearyl (meth)acrylate, and the like, may be exemplified. Here, in the present specification, "(iso or tertiary)" and "(iso)" signify both cases where these groups are and are not present, and, in a case where these groups are not present, normal is shown. In addition, "(meth)acrylate" represents acrylate, methacrylate or both.

As the aromatic group-containing monomer, a vinyl monomer having an aromatic group which may have a substituent including a hetero atom, 6 to 22 carbon atoms (preferably 6 to 18 carbon atoms, and more preferably 6 to 12 carbon atoms) is preferable, and, for example, the styrene-based monomer (component c-1) and the aromatic group containing-(meth)acrylate (component c-2) may be exemplified. As the substituent containing a hetero atom, those mentioned above may be exemplified.

Among the components c, from the viewpoint of improving the image density, an aromatic group-containing (meth)acrylate (component c-2) is preferable.

In the above, as the component c-1, styrene and 2-methyl styrene are particularly preferable. The content amount of the component c-1 in the components c, is preferably from 10 to 100 mass % and more preferably from 20 to 80 mass % from the viewpoint of image density improvement.

Further, as the aromatic group-containing (meth)acrylate (component c-2), benzyl(meth)acrylate, phenoxyethyl(meth)acrylate, and the like are preferable. The content amount of the component c-2 in the components c, is preferably from 10 to 100 mass % and more preferably from 20 to 80 mass % from the viewpoint of improvement of the image density and chroma. Further, it is preferable to use the component c-1 and the component c-2 together.

(d) Hydroxyl Group-Containing Monomer

Further, the monomer mixture may contain a (d) hydroxyl group-containing monomer (component d). The storage stability is improved by the inclusion of the hydroxyl group-containing monomer.

As component d, for example, 2-hydroxyethyl(meth)acrylate, 3-hydroxypropyl(meth)acrylate, polyethylene glycol (n=2 to 30, n represents the average addition mole number of oxyalkylene groups and the same applies below) (meth)acrylate, polypropylene glycol (n=2 to 30) (meth)acrylate, poly (ethylene glycol (n=1 to 15) propylene glycol (n=1 to 15)) (meth)acrylate and the like may be exemplified. Among these, 2-hydroxyethyl (meth)acrylate, polyethylene glycol monomethacrylate, and polypropylene glycol methacrylate are preferable.

(e) Other Monomers

The monomer mixture may further contain (e) other monomers (component e). Component e improves the ejectability.

$$CH_2=C(R^1)COO(R^2O)_qR^3 \quad (3)$$

In the formula (3), $R^1$ represents a hydrogen atom or a lower alkyl group of 1 to 5 carbon atoms, $R^2$ represents a divalent hydrocarbon group of 1 to 30 carbon atoms which may have a hetero atom, and $R^3$ represents a monovalent hydrocarbon group of 1 to 30 carbon atoms which may have a hetero atom, or a phenyl group which may have an alkyl group of 1 to 9 carbon atoms. q signifies the average addition mole number, and represents a number of 1 to 60, preferably a number of 1 to 30.

As the hetero atom included in the monomer of formula (3), for example, a nitrogen atom, an oxygen atom, a halogen atom, and a sulfur atom may be exemplified.

As suitable examples of $R^1$, a methyl group, an ethyl group, an (iso)propyl group and the like may be exemplified.

As preferable examples of an $R^2O$ group, an oxyethylene group, an oxytrimethylene group, an oxypropane-1,2-diyl group, an oxytetramethylene group, an oxyheptamethylene group, an oxyhexamethylene group, and an oxy alkanediyl group (oxyalkylene group) of 2 to 7 carbon atoms formed of a combination of two types or more of these may be exemplified.

As preferable examples of $R^3$, an aliphatic alkyl group of 1 to 30 carbon atoms, preferably 1 to 20 carbon atoms, and more preferably 1 to 8 carbon atoms; an alkyl group of 7 to 30 carbon atoms having an aromatic ring, an alkyl group of 4 to 30 carbon atoms having a hetero ring, or a phenyl group which may have an alkyl group of 1 to 8 carbon atoms, are preferable.

As a specific example of component e, methoxy polyethylene glycol (1 to 30: the value of q in formula (3) is shown and the same applies below) (meth)acrylate, methoxy polytetramethylene glycol (1 to 30) (meth)acrylate, ethoxy polyethylene glycol (1 to 30) (meth)acrylate, octoxy polyethylene glycol (1 to 30) (meth)acrylate, polyethylene glycol (1 to 30) (meth)acrylate-2-ethylhexyl ether, (iso)propoxy polyethylene glycol (1 to 30) (meth)acrylate, butoxy polyethylene glycol (1 to 30) (meth)acrylate, methoxy polypropylene glycol (1 to 30) (meth)acrylate, methoxy (copolymer of ethylene glycol and propylene glycol) (1 to 30, in which ethylene glycol: 1 to 29) (meth)acrylate, and the like, may be exemplified. Among these, octoxy polyethylene glycol (1 to 30) (meth)acrylate, and polyethylene glycol (1 to 30) (meth)acrylate 2-ethylhexyl ether are preferable.

Further, commercially available products on the market may be used, and, as specific examples of components d and e, multifunctional acrylate monomers manufactured by Shin Nakamura Chemical Co., Ltd (NK ester) M-40G (NK ester) M-90G (NK ester) M-230G; the Blemmer Series manufactured by NOF Corporation (for example: Blemmer-PE-90, Blemmer-PE-200, Blemmer-PE-350, PME-100, PME-200, PME-400, PME-1000, PP-500, PP-800, PP-1000, AP-150, AP-400, AP-550, AP-800, 50PEP-300, 50POEP-800B, 43PAPE600B), and the like may be exemplified.

The components a to e can each be used alone or as a mixture of two kinds or more.

During the manufacturing of the vinyl polymers, the content amounts of the components a to e in the monomer mixture (the content amount of the non-neutralized amount and the same applies below) or the content amount of the constituent units derived from components a to e in the vinyl polymer are as follows.

The content amount of the component a is preferably 3 to 40 mass %, more preferably 4 to 30 mass %, and particularly preferably 5 to 25 mass % from the viewpoint of the storage stability of the obtained dispersion.

The content amount of the component b is preferably 1 to 25 mass %, and more preferably 5 to 20 mass %, in particular, from the viewpoint of enhancing the interaction with the pigment.

The content amount of the component c is preferably 5 to 98 mass %, and more preferably 10 to 60 mass % from the viewpoint of improving print density.

The content amount of the component d is preferably 5 to 40 mass %, and more preferably 7 to 20 mass % from the viewpoint of the storage stability of the obtained dispersion.

The content amount of the component e is preferably 5 to 50 mass %, and more preferably 10 to 40 mass % from the viewpoint of improving the ejectability.

In addition, the total content amount of "component a and component d" in the monomer mixture is preferably 6 to 60 mass %, and more preferably 10 to 50 mass % from the viewpoint of the storage stability of the obtained dispersion. The total content amount of "component a and component e" is preferably 6 to 75 mass %, and more preferably 13 to 50 mass % from the viewpoint of the storage stability and ejectability of the obtained dispersion. The total content amount of "component a, component d, and component e" is preferably 6 to 60 mass %, and more preferably 7 to 50 mass % from the viewpoint of the storage stability and ejectability of the obtained dispersion. The mass ratio of "component a/[component b+component c] is preferably 0.01 to 1, more preferably 0.02 to 0.67, and even more preferably 0.03 to 0.50 from the viewpoint of the dispersion stability and image density of the obtained dispersion.

The polymers are manufactured by copolymerizing a monomer mixture using known polymerization methods such as a bulk polymerization method, a solution polymerization method, a suspension polymerization method, or an emulsion polymerization method. Among these polymerization methods, the solution polymerization method is preferable. For the details of the polymerization methods, it is possible to refer to the disclosure of paragraph numbers [0025] to [0028] of JP2009-46595A.

As a cross-linking agent, in order to suitably cross-link the polymer, a compound having two or more reactive functional groups in the molecule is preferable. The molecular weight of the cross-linking agent is preferably from 120 to 2000, more preferably from 150 to 1500, and particularly preferably from 150 to 1000 from the viewpoint of the ease of reaction and the storage stability of the obtained cross-linked polymer particles. In addition, the number of reactive functional groups included in the cross-linking agent is preferably 2 to 4, and 2 or 3 is the most preferable from the viewpoint of controlling the molecular weight and improving the storage stability. As the reactive functional group, one or more selected from a group consisting of a hydroxyl group, an epoxy group, an aldehyde group, an amino group, a carboxy group, and an oxazoline group may be preferably exemplified.

It is preferable that, when dissolved in 100 g of water at 25° C., the dissolved amount of the cross-linking agent is preferably 50 g or less, more preferably 40 g or less, even more preferably 30 g or less from the viewpoint of efficiently cross-linking the surface of polymer and increasing the storage stability.

As specific examples of the cross-linking agent, the following (a) to (e) may be exemplified.

(a) compound having two or more hydroxyl groups in the molecule: for example, polyvalent alcohols such as ethylene glycol, diethylene glycol, triethylene glycol, polyethylene glycol, glycerol, polyglycerol, propylene glycol, 1,4-butanediol, 1,5-pentanediol, 1,6-hexanediol, neopentyl alcohol, diethanolamine, tri-diethanolamine, polypropylene glycol, polyvinyl alcohol, pentaerythritol, sorbitol, sorbitan, glucose, mannitol, mannitan, sucrose, and glucose.

(b) compound having two or more epoxy groups in the molecule: for example, polyglycidyl ethers such as ethylene glycol diglycidyl ether, polyethylene glycol diglycidyl ether, polypropylene glycol diglycidyl ether, glycerin triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether, and hydrogenated bisphenol A type diglycidyl ether.

(c) compound having two or more aldehyde groups in the molecule: for example, poly aldehydes such as glutaraldehyde and glyoxal.

(d) compound having two or more amino groups in the molecule: for example, polyamines such as ethylenediamine and polyethylene imine.

(e) compound having two or more carboxy groups in the molecule: for example, polyvalent carboxylic acid such as oxalic acid, malonic acid, succinic acid, fumaric acid, maleic acid, and adipic acid.

(f) compound having two or more oxazoline groups in the molecule: for example, a compound in which two or more, preferably two or three oxazoline groups are linked to an aliphatic group or aromatic group, more specifically, a compound having a terminal oxazoline group obtained by reacting a bisoxazoline compound such as 2,2'-bis(2-oxazoline), 1,3-phenylene bisoxazoline, and 1,3-benzo bisoxazoline, with a polybasic carboxylic acid.

In the above-mentioned cross-linking agents, the compound having two or more epoxy groups in the (b) molecule is preferable, and ethylene glycol diglycidyl ether and trimethylolpropane polyglycidyl ether are particularly preferable.

For the details of the cross-linking agents, reactive groups of the polymer and combinations thereof, it is possible to refer to the disclosure of paragraph numbers [0031] to of JP2009-46595A.

For the manufacturing of the cross-linked polymer particles, from the viewpoint of storage stability, a method of manufacturing using a step I of using a quinacridone solid solution pigment and a polymer to obtain a polymer particle containing a quinacridone solid solution pigment and a step II of mixing the polymer particle containing a quinacridone solid solution pigment obtained in step I and a cross-linking agent and cross-linking the polymer to obtain a cross-linked polymer particle is preferable.

The manufacturing method according to step I and step II can, for example, be performed using the following Steps (1) to (3).

Step (1): A step of performing a dispersion treatment on a mixture containing a polymer, an organic solvent, the quinacridone solid solution pigment, water, and, according to necessity, a neutralizing agent and obtaining a dispersion of the polymer particles containing the quinacridone solid solution pigment.

Step (2): A step of removing the organic solvent from the dispersion obtained in Step (1) and obtaining an aqueous dispersion of the polymer particles containing the quinacridone solid solution pigment.

Step (3): A step of cross-linking the polymer particles containing the quinacridone solid solution pigment obtained in Step (2) with a cross-linking agent and obtaining an aqueous dispersion of the solid solution pigment-containing cross-linked polymer particles.

Here, for the details of the manufacturing method of the cross-linked polymer particles, it is possible to refer to the disclosure of paragraph numbers [0036] to [0040] of JP2009-46595A.

In the present invention, the cross-linked particles including the quinacridone solid solution pigment can be used as an aqueous dispersion including the solid solution pigment-containing cross-linked polymer particles, and are preferably suitably obtained using the Steps (1) to (3). The aqueous dispersion may be used as it is as water-based ink; however, wetting agents, penetrants, dispersants, viscosity modifiers, defoaming agents, fungicides, anti-rust agents, and the like commonly used in ink for ink jet recording applications may be added.

The content ratio of the quinacridone solid solution pigment in the ink composition is preferably 2 to 15 mass %, more preferably 2 to 7 mass %, and even more preferably 2 to 5 mass %, with respect to the total mass of the ink composition from the viewpoint of improving the storage stability, the chroma, and the image density.

Further, as the content ratio of the quinacridone solid solution pigment with respect to the total mass of the colored particles, a range of 10% or more at a mass standard is preferable and a range of 20% or more is more preferable.

Regarding the mass ratio [polymer/quinacridone solid solution pigment] of the quinacridone solid solution pigment and the polymer (resin coating the solid solution pigment), from the viewpoint of improving the storage stability 1/9 to 9/1 is preferable, 1/4 to 4/1 is more preferable, and 1/4 to 1/1 is particularly preferable.

As the content amount of the cross-linked particles in the ink composition with respect to the total mass of the ink composition, 1 to 15 mass % is preferable and 2 to 8 mass % is more preferable. By the content amount of the quinacridone solid solution pigment being 1 mass % or more, the color phase and the color reproduction range are more favorable, and by the content amount being 15 mass % or less, the dispersibility and the stability thereof are favorably maintained, which is advantageous.

—Polymerizable Compound—

The ink composition of the present invention contains at least one type of water-soluble polymerizable compound and may be polymerized by irradiation with active energy rays. The polymerizable compound is used along with the pigment and resin particles, and when aggregated by being in contact with the treatment liquid, the polymerizable compound is taken in between the particles, and the image is strengthened by the polymerization curing that follows.

Water solubility refers to the ability to be dissolved in water at a certain concentration or greater, and a substance that can be (desirably evenly) dissolved in aqueous ink or treatment liquid is sufficient. Further, water-solubility may also refer to a substance that can be dissolved (desirably evenly) in ink by adding a water-soluble organic solvent to be described later The polyvalent alcohol may be one in which the chain length is extended by an ethylene oxide chain on the inside by the addition of ethylene oxide.

Below, specific examples of nonionic polymerizable compounds (nonionic compounds 1 to 6) are shown. However, the present invention is not limited to such examples.

[Chem. 2]

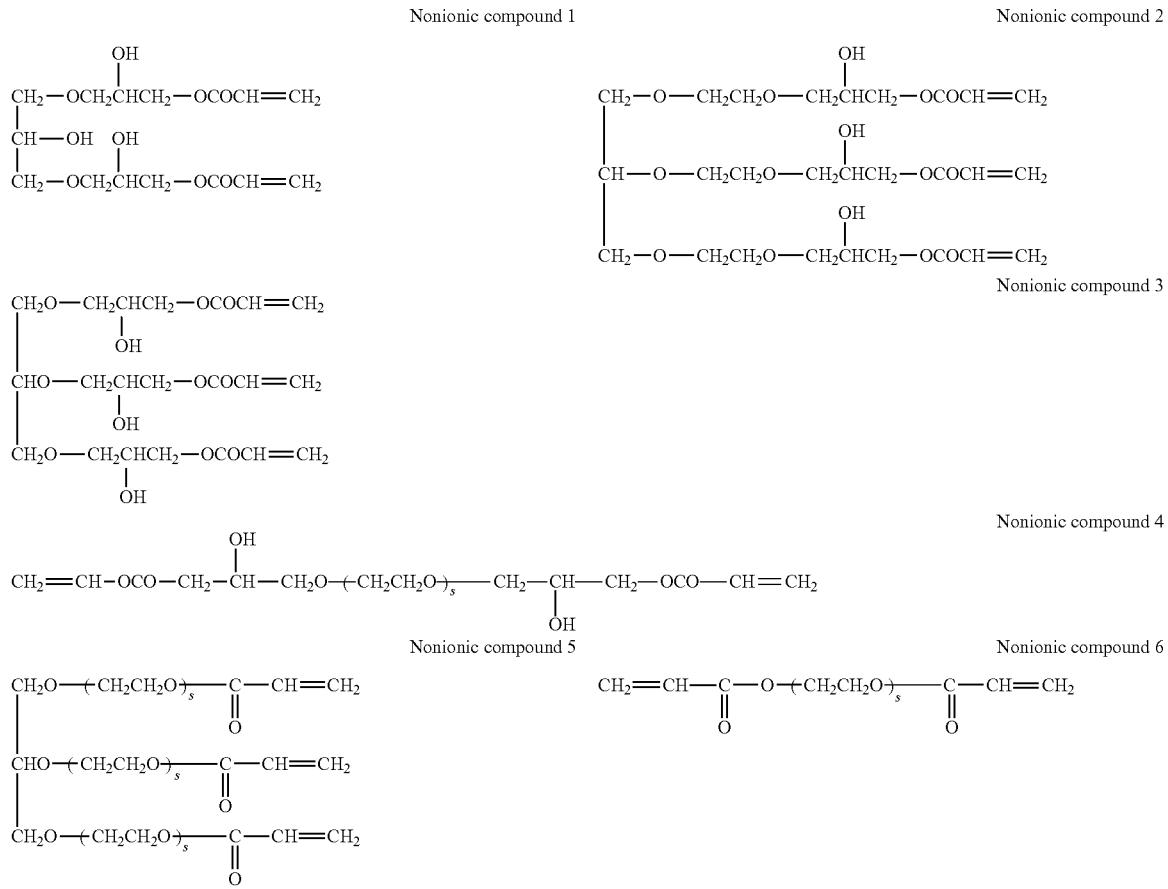

and raising the solubility. Specifically, it is preferable that the solubility with respect to water (25° C.) be 10 mass % or more, and 15 mass % or more is more preferable.

From the viewpoint of not preventing the reaction between the aggregated components and the pigment, and the resin particles, a nonionic or cationic polymerizable compound is preferable as the polymerizable compound, and a polymerizable compound with solubility with respect to water (25° C.) of 10 mass % or more (more preferably 15 mass % or more) is preferable.

As nonionic polymerizable monomers, for example, polymerizable compounds such as (meth)acryl monomers may be exemplified.

As the (meth)acryl monomers, for example, ultraviolet curable-type monomers and oligomers such as polyvalent alcohol (meth)acrylic acid ester, polyvalent alcohol glycidyl ether (meth)acrylic acid ester, polyethylene glycol (meth) acrylic acid ester, polyvalent alcohol ethylene oxide-added compound (meth)acrylic acid ester, and reactants between polybasic acid anhydride and hydroxyl group-containing (meth)acrylic acid ester, may be exemplified.

In addition, it is also possible to use an acrylic ester which has two or more acryloyl groups in one molecule which is derived from a multi-hydroxyl group compound. As the multi-hydroxyl group compounds, for example, condensates of glycols, oligo ether, oligo esters, and the like may be exemplified.

Furthermore, as the nonionic polymerizable compound, (meth)acrylic acid ester of a polyol that includes two or more hydroxyl groups such as a monosaccharide or a disaccharide, or (meth)acrylic acid ester with triethanolamine, diethanolamine, tris hydroxymethyl amino methane, tris hydroxymethyl amino ethane, or the like is suitable.

Further, as the nonionic polymerizable compound, a water-soluble polymerizable compound having an acrylamide structure in the molecule is also suitable. The compound represented by the following general formula (1) is more preferable as the polymerizable compound having an acrylamide structure in the molecule.

[Chem. 3]

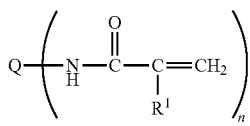

General formula (1)

In general formula (1), Q represents an n-valent group and R$^1$ represents a hydrogen atom or a methyl group. Further, n represents an integer of 1 or more.

The compound represented by the general formula (1) is one in which an unsaturated vinyl monomer is linked to the group Q using an amide link. R$^1$ represents a hydrogen atom or a methyl group, and is preferably a hydrogen atom. From the viewpoint of improving the polymerization efficiency and the ejection stability, the valence n of the group Q is 1 or more, with 1 or more to 6 or less being preferable, and 1 or more to 4 or less being more preferable. Further, it is preferable that a multi-functional (meth)acrylamide in which n≥2 with excellent polymerization efficiency be included, and furthermore, it is preferable that a mono-functional (meth)acrylamide in which n=1 with excellent permeability and a multi-functional (meth)acrylamide in which n≥2 with excellent polymerization efficiency be used together.

Further, the group Q is not particularly limited as long as the group Q is a group that can be bonded with a (meth)acrylamide structure; however, it is preferable that the compound represented by general formula (1) be selected from groups that satisfy the water solubility described above. Specifically, a residue in which one or more hydrogen atoms or hydroxyl groups are removed from a compound selected from the following compound group X can be exemplified.

—Compound Group X—

Polyols such as ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentane diol, 2-methyl-2,4-pentane diol, 1,5-hexanediol, 1,6-hexanediol, 2,5-hexanediol, glycerin, 1,2,4-butane triol, 1,2,6-hexane triol, 1,2,5-pentane triol, thio glycol, trimethylolpropane, ditrimethylolpropane, trimethylol ethane, ditrimethylolethane, neopentyl glycol, pentaerythritol, dipentaerythritol, and condensates thereof, low molecular polyvinyl alcohols, or sugars.

Polyamines such as ethylenediamine, diethylenetriamine, triethylenetetramine, polyethylene imine, and polypropylene diamine.

In addition, a substituted or unsubstituted alkylene chain having four or less carbon atoms such as methylene, ethylene, propylene, and butylene groups; furthermore, functional groups or the like having saturated or unsaturated hetero rings such as a pyridine ring, an imidazole ring, a pyrazine ring, a piperidine ring, a piperazine ring, and a morpholine ring, can be exemplified.

When n=1, an alkyl group or a substituted alkyl group is suitable as the group Q, and the number of carbon atoms of the alkyl is preferably 1 to 5, and the number of carbon atoms is more preferably 1 to 3. Examples of the substituent in a case where the alkyl group is substituted include a hydroxyl group, an amino group, and the like.

Further, when n≥2, the group Q represents a bonded group. The bonded group is preferably a residue of polyols including an oxyalkylene group (preferably an oxyethylene group), and is particularly preferably a residue of polyols including three or more oxyalkylene groups (preferably oxyethylene groups).

Specific examples of the water-soluble polymerizable compound having an acrylamide structure in the molecule are shown below. However, the present invention is not limited to such examples.

[Chem. 4]

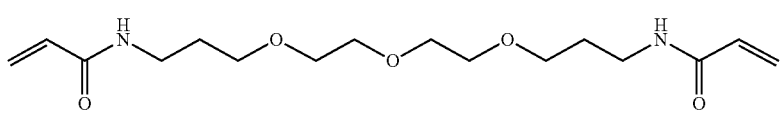

Polymerizable compound 1

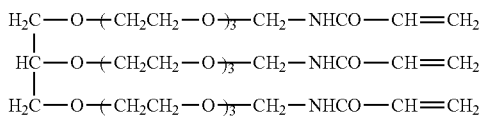

Polymerizable compound 2

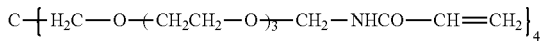

Polymerizable compound 3

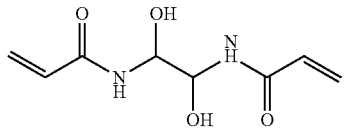

Polymerizable compound 4

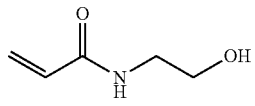

Polymerizable compound 5

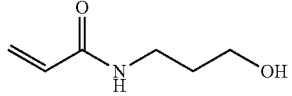

Polymerizable compound 6

Polymerizable compound 7

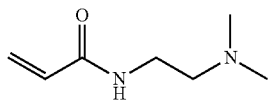

Polymerizable compound 8

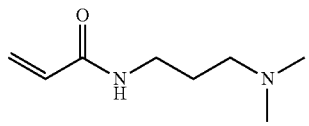

Polymerizable compound 9

-continued
[Chem. 5]
(a)
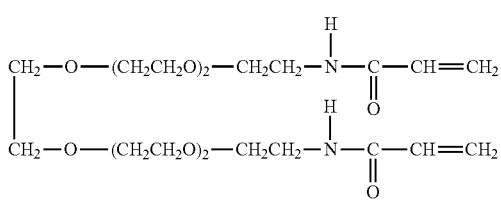
(b)
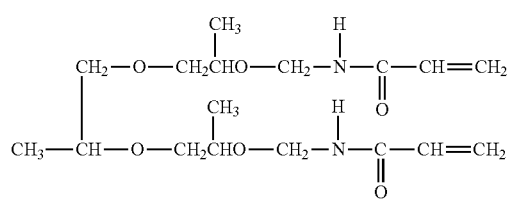
(c)
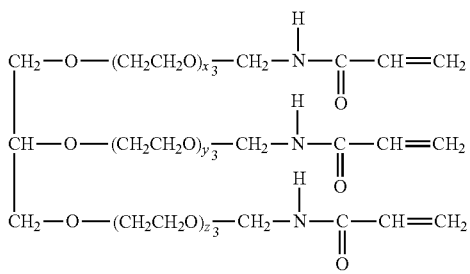
$x_3 + y_3 + z_3 = 6$
(d)
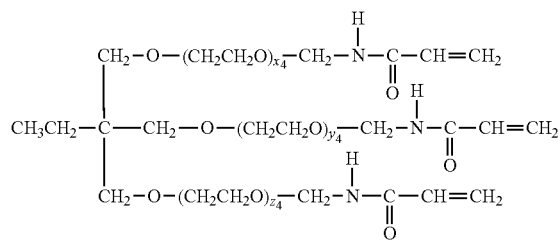
$x_4 + y_4 + z_4 = 9$
[Chem. 6]
(e)
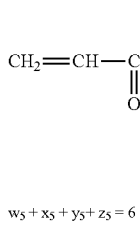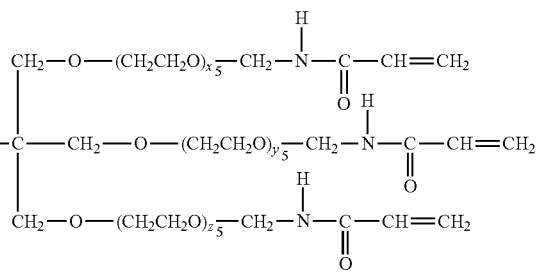
$w_5 + x_5 + y_5 + z_5 = 6$
(f)
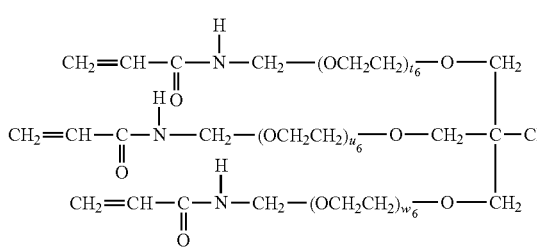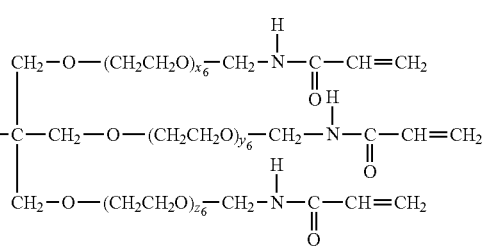
$t_6 + u_6 + w_6 + x_6 + y_6 + z_6 = 12$
(g)
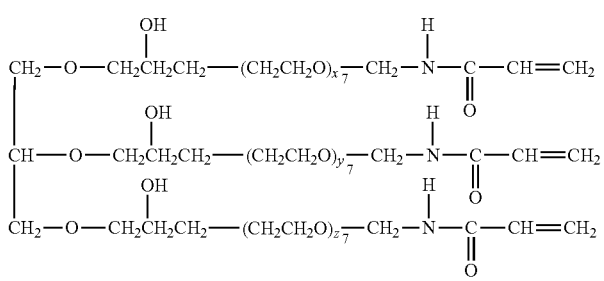
$x7 + y7 + z7 = 3$

[Chem. 7]

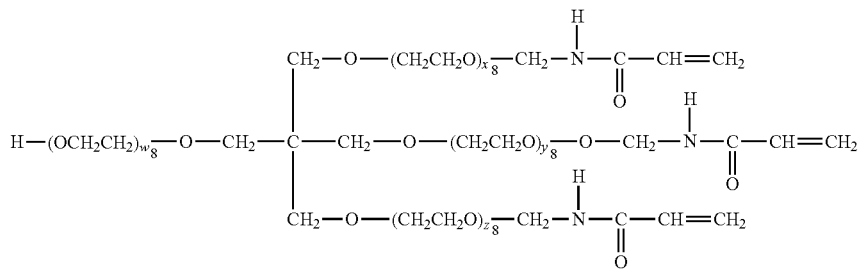

(h)

w8 + x8 + y8 + z8 = 6

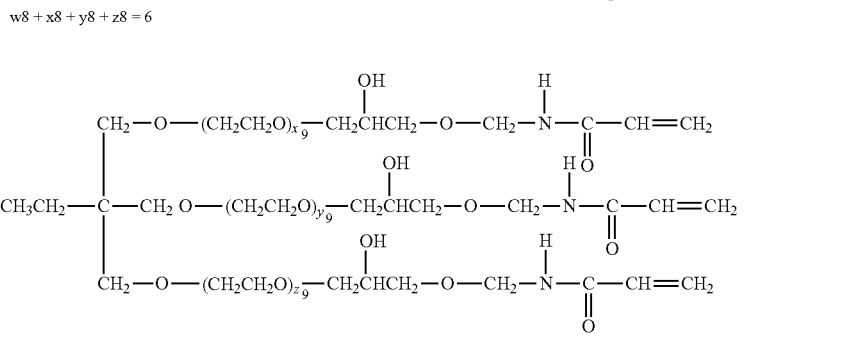

(i)

x9 + y9 + z9 = 3

The cationic polymerizable compound is a compound having a cationic group and a polymerizable group such as an unsaturated double link, and for example, epoxy monomers, oxetane monomers, or the like can be suitably used. If the cationic polymerizable compound is contained, the cationic property of the ink composition is strengthened by including a cationic group, and the mixing of colors when an anionic ink is used is prevented more effectively.

As the cationic polymerizable compound, for example, N,N-dimethyl amino ethyl methacrylate, N,N-dimethyl amino ethyl acrylate, N,N-dimethyl amino propyl methacrylate, N,N-dimethyl amino propyl acrylate, N,N-dimethyl amino acrylamide, N,N-dimethyl amino methacrylamide, N,N-dimethyl amino ethyl acrylamide, N,N-dimethyl amino ethyl methacrylamide, N,N-dimethylaminopropyl acrylamide, N,N-dimethyl amino propyl methacrylamide, quaternary compounds thereof, and the like may be exemplified.

As the epoxy monomers, for example, polyvalent alcohol glycidyl ether, glycidyl ester, aliphatic cyclic epoxide, and the like may be exemplified.

Furthermore, examples of the cationic polymerizable compound include the following structures.

[Chem. 8]

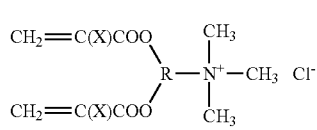

Structure 1

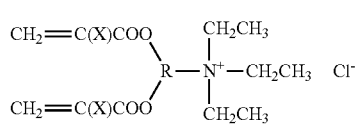

Structure 2

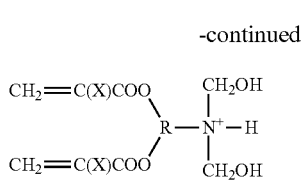

Structure 3

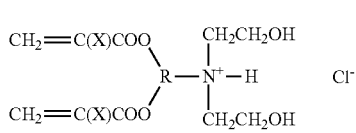

Structure 4

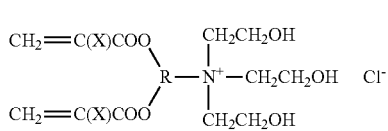

Structure 5

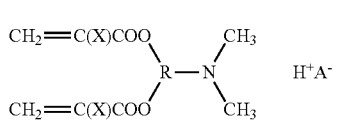

Structure 6

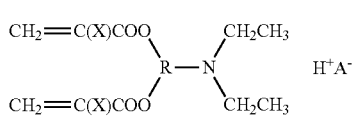

Structure 7

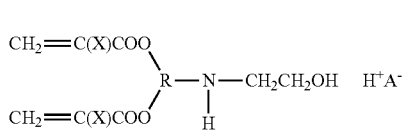

Structure 8

-continued

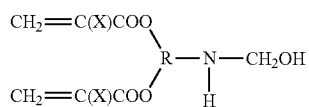
Structure 9

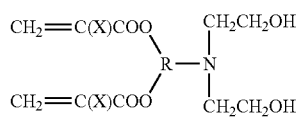
Structure 10

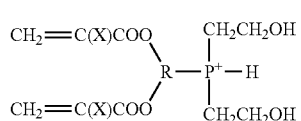
Structure 11

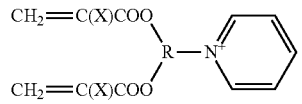
Structure 12

In the structures above, R represents a polyol residue. Further, X represents H or $CH_3$, and $A^-$ represents $Cl^-$, $HSO_3^-$, or $CH_3COO^-$. As the compound for introducing the polyol, for example, glycerin, 1,2,4-butane triol, 1,2,5-pentane triol, 1,2,6-hexane trial, trimethylol propane, trimethylol methane, trimethylol ethane, pentaerythritol, bisphenol A, alicyclic bisphenol A, condensates thereof, and the like, may be exemplified.

Specific examples of polymerizable compounds having a cationic group (Cationic Compounds 1 to 11) are exemplified below

[Chem. 9]

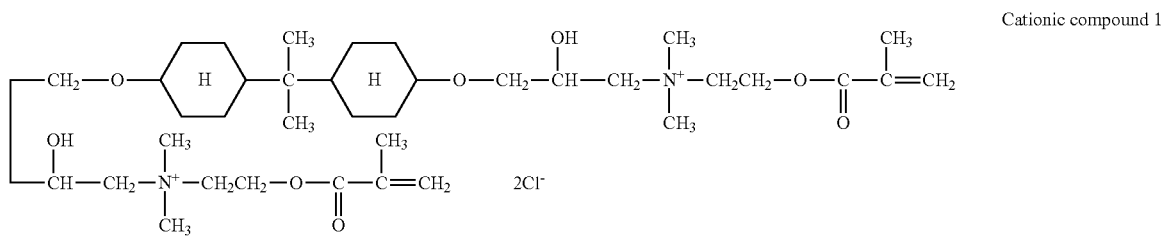

Cationic compound 1

(where ⬡H is cyclohexane)

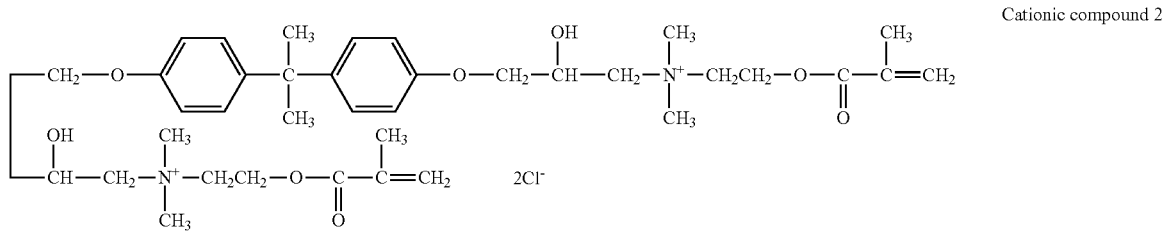

Cationic compound 2

[Chem. 10]

Cationic compound 3

-continued
Cationic compound 4
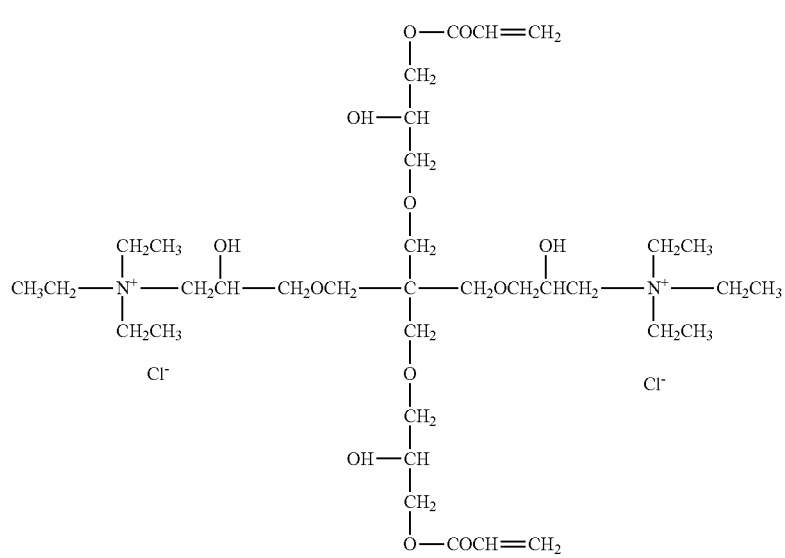
Cationic compound 5
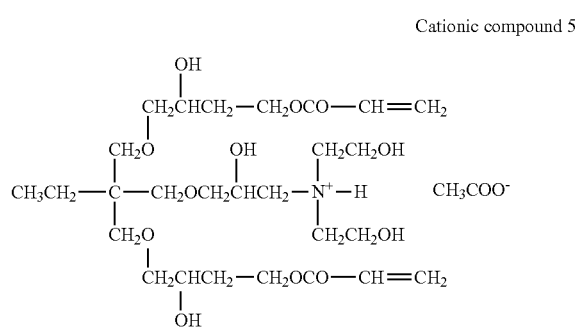
Cationic compound 6
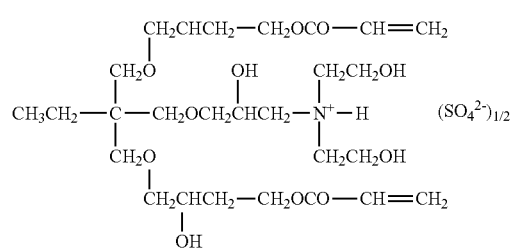
[Chem. 11]
Cationic compound 7
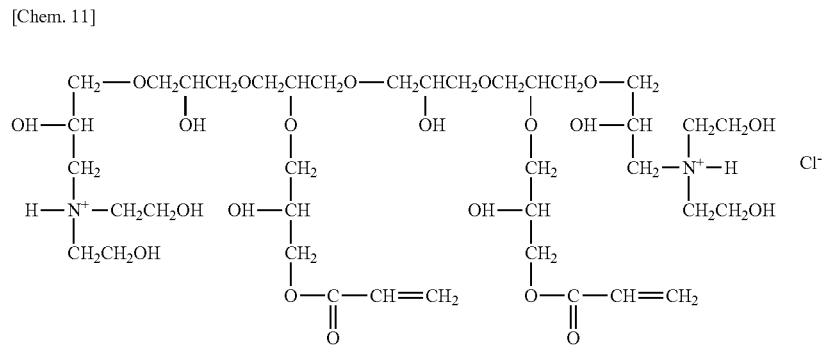
Cationic compound 8
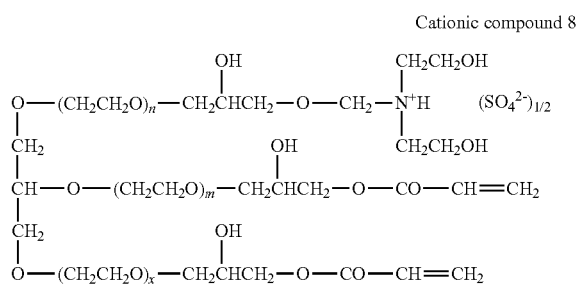
n + m + k = 15
Cationic compound 9
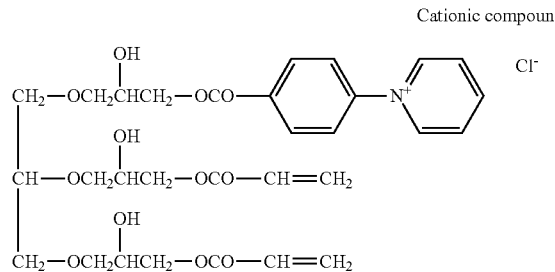

[Chem. 12]

Cationic compound 10

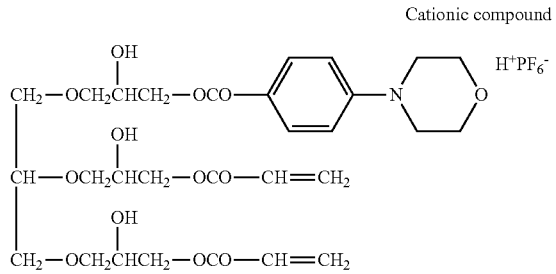

Cationic compound 11

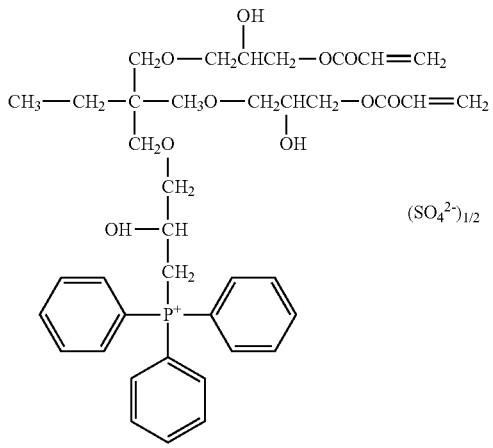

As the polymerizable compound according to the present invention, from the viewpoint of being able to increase abrasion resistance, a multi-functional monomer is preferable, and di- to hexa-functional monomers are preferable, and from the viewpoint of realizing both solubility and abrasion resistance, di- to tetra-functional monomers are preferable.

As the content ratio [q:p [mass ratio]] of the polymerizable compound (p) according to the present invention and the cross-linked particles (q) described earlier, 1:1 to 1:20 is preferable, 2:3 to 1:15 is more preferable, and 1:2 to 1:10 is even more preferable. If the content ratio (q:p) is 1:1 or more, that is, if the ratio of the polymerizable compound is within a range which is not too small in comparison with the cross-linked particles, the adhesiveness of the image is further improved. Further, it is advantageous in terms of the ejectability if the content ratio (q:p) is 1:20 or less, that is, if the ratio of the polymerizable compound is within a range which is not too much in comparison with the cross-linked particles.

It is possible for the polymerizable compound to be contained as one type alone or two or more types in combination.

It is preferable that the content amount of the polymerizable compound in the ink composition with respect to the total mass of the ink composition be 15 mass % or more and less than 30 mass %, and 15 mass % or more and 25 mass % or less is more preferable. If the content amount of the polymerizable compound is 15 mass % or more, the adhesiveness to the recording medium is improved and the image strength is further increased, whereby the abrasion resistance of the image is excellent. It is advantageous in terms of the level difference (pile height) of the image that the content amount of the polymerizable compound be 40 mass % or less.

—Polymerization Initiator—

The ink composition of the present invention is able to contain at least one type of polymerization initiator which may or may not be contained in a treatment liquid described later and which initiates polymerization of the polymerizable compound using active energy rays. The polymerization initiator may be used as a single type, by mixing two or more types, or using together with a sensitizer.

The polymerization initiator can contain an appropriately selected compound capable of initiating a polymerization reaction of the polymerizable compound using active energy rays. As examples of polymerization initiators, polymerization initiators (for example, photopolymerization initiators and the like) generating active species (radicals, acids, bases, and the like) using radiation, light, or electron beams may be exemplified.

As the photopolymerization initiators, for example, acetophenone, 2,2-diethoxyacetophenone, p-dimethylamino acetophene, p-dimethylamino propiophenone, benzophenone, 2-chloro benzophenone, p,p'-dichloro-benzophene, p,p'-bis diethyl amino benzophenone, Michler's ketone, benzyl, benzoin, benzoin methyl ether, benzoin ethyl ether, benzoin isopropyl ether, benzoin n-propyl ether, benzoin isobutyl ether, benzoin n-butyl ether, benzyl dimethyl ketal, tetramethylthiuram mono-sulfide, thioxanthone, 2-chloro thioxanthone, 2-methyl thioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propane-1-on, 2-hydroxy-2-methyl-1-phenyl-1-on, 1-(4-isopropylphenyl)-2-hydroxy-2-methyl propane-1-on, and methylbenzoyl formate, may be exemplified. In addition, for example, aromatic diazonium salts, aromatic halonium salts, aromatic sulfonium salts, metallocene compounds, and the like of triphenylsulfonium hexafluorophosphate and diphenyliodonium hexafluoroantimonate, and the like may be exemplified.

Further, examples of the polymerization initiator include the compound represented by the following general formula (2), the compound disclosed in JP2005-307198A, and the like. Among such examples, from the viewpoint of adhesiveness and abrasion resistance, the polymerization initiator represented by the following general formula (2) is preferable.

[Chem. 13]

(2)

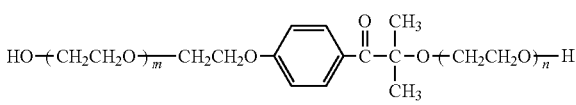

In the general formula (2), m and n each independently represent an integer of 0 or more, and m+n represents an integer of 0 to 3. It is preferable that m be 0 to 3 and n be 0 or 1, and more preferable that m be 0 or 1 and n be 0. A specific example of the compound represented by the general formula (2) is shown below. However, the present invention is not limited thereto.

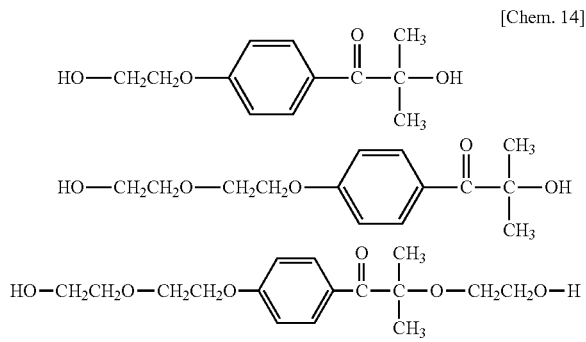

[Chem. 14]

The compound represented by the general formula (2) may be a compound synthesized in accordance with the disclosure of JP2005-307198A or the like or may be a commercially available compound. IRGACURE 2959 (m=0, n=0) may be exemplified as a commercially available compound.

Further, the polymerization initiator according to the present invention is preferably a water-soluble polymerization initiator. Here, "water-soluble" signifies dissolving 0.5 mass % or more in distilled water at 25° C., and dissolving 1 mass % or more in distilled water at 25° C. is preferable, and dissolving 3 mass % or more is more preferable.

In a case where the ink composition contains a polymerization initiator, with respect to the polymerizable compound, the content amount of the polymerization initiator in the ink composition is preferably 0.07 to 0.2 mass %, and more preferably 0.1 to 0.17 mass %. If the content amount of the polymerization initiator is 0.07 mass % or more, the abrasion resistance of the image further improves, which is advantageous in high-speed recording, and if the content amount is 0.2 mass % or less, there is an advantage in terms of the ejection stability.

As the sensitizer, amine-based compounds (an aliphatic amine, an amine that includes an aromatic group, piperidine, and the like), a urea (allyl-based ureas, o-tolylthio urea, and the like), a sulfur compound (sodium diethyl dithiophosphate, soluble salt of aromatic sulfinic acid, and the like), a nitrile-based compound (N,N, di-substituted p-amino benzonitrile, and the like), a phosphorous compound (tri-n-butyl phosphine, sodium diethyl dithio phosphide, and the like), a nitrogen compound (Michler's ketone, a N-nitroso hydroxylamine derivative, an oxazolidine compound, a tetrahydro 1,3 oxazine compound, formaldehyde, a condensate of acetaldehyde and a diamine, and the like), a chlorine compound (carbon tetrachloride, hexachloroethane, and the like), polymeric amines of a reaction product of an epoxy resin and an amine, triethanolamine triacrylate, and the like may be exemplified.

The sensitizer can be contained in a range not impairing the effects of the present invention.

—Water—

The ink composition of the present invention contains water and the amount of the water is not particularly limited. Herein, a preferable content amount of water is 10 to 99 mass %, more preferably 30 to 80 mass %, and even more preferably 45 to 70 mass %.

—Water-Soluble Organic Solvent—

The ink composition according to the present invention may also contain a water-soluble organic solvent. In a case where a water-soluble organic solvent is contained, the content amount is preferably small, and in the present invention, it is preferable that the content amount of the water-soluble organic solvent be less than 3 mass % with respect to the total mass of the ink composition. From the viewpoint of improving the solubility of the polymerizable compound, the lower limit of the content amount of the water-soluble organic solvent is desirably 0.5 mass %.

The water-soluble organic solvent has the effect of preventing drying of the ink composition and promoting wetting or permeation of the paper. As the water-soluble organic solvents that may be contained in the ink composition, for example:

glycols such as glycerin, 1,2,6-hexane triol, trimethylol propane, ethylene glycol, propylene glycol, diethylene glycol, triethylene glycol, tetraethylene glycol, pentaethylene glycol, and dipropylene glycol, polyvalent alcohols such as alkane diols such as 2-butene-1,4-diol, 2-ethyl-1,3-hexane diol, 2-methyl-2,4-pentane diol, 1,2-octanediol, 1,2-hexanediol, 1,2-pentane diol, and 4-methyl-1,2-pentanediol; glycol ethers such as ethylene glycol monomethyl ether, ethylene glycol monoethyl ether, ethylene glycol monobutyl ether, ethylene glycol monomethyl ether acetate, diethylene glycol monomethyl ether, and diethylene glycol monoethyl ether; as well as the water-soluble organic solvents disclosed in paragraph number [0116] of JP2011-42150A (sugars and sugar alcohols, hyaluronic acids, alkyl alcohols with 1 to 4 carbon atoms, other glycol ethers, 2-pyrrolidone, N-methyl-2-pyrrolidone), and the like may be exemplified. One type or two types or more of the solvents may be appropriately selected and used. Polyvalent alcohols are also useful as anti-drying agents and wetting agents, and for example, the example disclosed in paragraph number [0117] of JP2011-42150A can also be exemplified. Further, a polyol compound is preferable as a wetting agent, and for example, the example disclosed in paragraph number [0117] of JP2011-42150A can be exemplified as an aromatic diol.

Other than the above, the water-soluble organic solvent may be exemplified by the compounds represented by the following structural formula (1).

[Chem. 15]

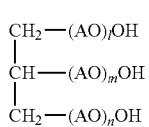

Structural Formula (1)

In Structural Formula (1), l, m and n each independently represent an integer of 1 or more, and l+m+n=3 to 15. In particular, if l+m+n is 3 or more, a curling suppression effect is obtained, and if l+m+n is equal to or less than 15, the ejectability can be favorably maintained. Herein, 3 to 12 is preferable, and 3 to 10 is more preferable. AO represents one or both of ethyleneoxy (may be abbreviated to EO) and propyleneoxy (may be abbreviated to PO), and among these, a propyleneoxy group is preferable. Each AO of $(AO)_l$, $(AO)_m$, and $(AO)_n$ in the structural formula may be the same or different from each other.

The details of the compound represented by the structural formula (1) are disclosed in paragraphs [0121] to [0125] in JP2011-42150A. A commercially available product on the market may be used as a glycerin alkylene oxide adduct, and examples of polyoxypropylized glycerins (ether of polypropylene glycol and glycerin) include Sunnix GP-250 (average molecular weight 250), Sunnix GP-400 (average molecular weight 400), Sunnix GP-600 (average molecular weight 600) (all manufactured by Sanyo Chemical Industries, Ltd.), and the examples disclosed in paragraph number [0126] in JP2011-42150A.

—Other Components—

The ink composition according to the present invention can be configured using other additives other than the components described above. Examples of other additives include known additives such as a polymerization inhibitor, an anti-drying agent (wetting agent), an anti-fading agent, an emulsion stabilizer, a penetration enhancer, an ultraviolet absorbing agent, a preservative, a fungicide, a pH adjusting agent, a surface tension adjusting agent, a defoaming agent, a viscosity adjusting agent, a dispersion stabilizer, a rust inhibitor, and a chelating agent. Generally, the various additives are added directly to the ink in the case of the ink composition, and added to the dispersant after the preparation of a dye dispersant in a case where an oil-based dye is used as the dispersant; however, the additives may be added to an oil phase or an aqueous phase during the preparation.

The ink composition according to the present invention can contain colloidal silica. It is possible to prevent deterioration in the liquid repellency of the ink jet head member and to increase the ejectability. From such a viewpoint, the content amount of the colloidal silica in the ink composition of the present invention can be set to, for example, 0.0001 to 10 mass % with respect to the total amount of the ink composition.

The colloidal silica is a colloid made of minute particles of an inorganic oxide including silicon with an average particle diameter of several 100 nm or less. Silicon dioxide (including a hydrate thereof) may be included as the principal component, and aluminate may be included as a minor component. Examples of the aluminate that may be included as a minor component include sodium aluminate, potassium aluminate, and the like.

The colloidal silica may be manufactured by the manufacturing method described above or may be a commercially available product. Specific examples of commercially available silica include Ludox AM, Ludox AS, Ludox LS, Ludox TM, Ludox HS, and the like (all manufactured by E.I. du Pont de Nemours & Co); Snowtex S, Snowtex XS, Snowtex 20, Snowtex 30, Snowtex 40, Snowtex N, Snowtex C, Snowtex O, and the like (all manufactured by Nissan Chemical Industries, Ltd.); Cataloid-S, Cataloid-F120, Cataloid SI-350, Cataloid SI-500, Cataloid SI-30, Cataloid S-20L, Cataloid S-20H, Cataloid S-30L, Cataloid S-30H, Cataloid SI-40, OSCAL-1432 (isopropyl alcohol sol), and the like (all manufactured by JGC Catalysts and Chemicals Ltd.); Adelite (manufactured by Adeka Corporation); and, as beaded colloidal silica, for example, Snowtex ST-UP, Snowtex PS-S, Snowtex PS-M, Snowtex ST-OUP, Snowtex PS-SO, Snowtex PS-MO (all manufactured by Nissan Chemical Industries, Ltd.), and the like.

For details of the colloidal silica, it is possible to refer to the disclosure of paragraph numbers [0013] to [0019] in JP2011-063770A.

Further, the ink composition according to the present invention can use various surfactants, among which an aspect in which an acetylene glycol-based surfactant is contained is preferable.

Compared to other surfactants, an acetylene glycol-based surfactant can more easily appropriately maintain surface tension and interfacial tension between the ink and the ink jet head member (head nozzles and the like) that come into contact, and does not easily foam. Therefore, the ejection stability when the ink composition is ejected can be increased. Further, by including an acetylene glycol-based surfactant, the wettability and permeability with respect to the recording medium become favorable, and shade unevenness or bleeding of the ink is suppressed, which is advantageous in detailed image formation.

Examples of acetylene glycol-based surfactants include Surfynol 104, Surfynol 104E, Surfynol 104H, Surfynol 104A, Surfynol 104BC, Surfynol 104DPM, Surfynol 104PA, Surfynol 104PG-50, Surfynol 104S, Surfynol 420, Surfynol 440, Surfynol 465, Surfynol 485, Surfynol SE, Surfynol SE-F, Surfynol 504, Surfynol 61, Surfynol DF37, Surfynol CT111, Surfynol CT121, Surfynol CT131, Surfynol CT136, Surfynol TG; and Surfynol GA (all manufactured by Air Products and Chemicals. Inc.), Olfin B, Olfin Y, Olfin P, Olfin A, Olfin STG, Olfin SPC, Olfin E1004, Olfin E1010, Olfin PD-001, Olfin PD-002W, Olfin PD-003, Olfin PD-004 Olfin EXP.4001, Olfin EXP.4036, Olfin EXP.4051, Olfin AF-103 Olfin AF-104, Olfin AK-02, Olfin SK-14, Olfin AE-3 (all manufactured by Nissin Chemical Co., Ltd.), Acetylenol E00, Acetylenol E00P, Acetylenol E40, and Acetylenol E100 (all manufactured by Kawaken Fine Chemicals Co., Ltd.), and the like.

With respect to the total mass of the ink composition, the content amount of the acetylene-based surfactant in the ink composition is preferably 0.1 to 1.5 mass % and more preferably 0.5 to 1.0 mass %. If the content amount is 0.1 mass % or more, the ink tends to spread evenly on the recording medium, shade unevenness and bleeding of the ink are suppressed, and thus a more homogeneous image is obtained. If the content amount is 1.5 mass % or less, the storage stability and ejection stability of the ink composition are further improved.

<Ink Set>

The ink set of the present invention is configured using the ink composition of the present invention described earlier and a treatment liquid that includes an aggregation component that forms an aggregate when brought into contact with the ink composition. Since the ink set of the present invention uses the ink composition described earlier and the treatment liquid together, the formed image has excellent detail and adhesiveness, and has excellent recoverability after being left after use is interrupted or stopped, such as in long-term storage or after time a high temperature environment.

Here, details of the ink composition are as described earlier.

—Treatment Liquid—

The treatment liquid that configures the ink set will be described in detail below.

When the treatment liquid that is applied to the recording medium comes into contact with the ink composition, the dispersed particles such as the colored particles in the ink composition are aggregated to fix an image on the recording medium. The treatment liquid contains at least an aggregation component that aggregates the components in the ink composition, may further include a polymerization initiator, and may be configured using other components than these according to necessity.

Further, by using the treatment liquid along with the ink composition, the ink jet recording can be made faster, and an image with high density and resolution and excellent drawability (for example, reproducibility of thin lines and detailed portions) is obtained even with high-speed recording.

The aggregation component may be a compound that can change the pH of the ink composition, a polyvalent metallic salt, or a polymer having quaternary or tertiary amines such as polyallylamines. In the present invention, from the viewpoint of the aggregability of the ink composition, a compound that can change the pH of the ink composition is preferable, and a compound that can reduce the pH of the ink composition is more preferable.

As the compound which is able to reduce the pH of the ink composition, acidic compounds may be exemplified. As the acidic compounds, for example, sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, and nicotinic acid, or derivatives of these compounds, salts thereof, or the like may be suitably exemplified.

One type of acidic compound may be used alone or two types or more may be used together.

When the treatment liquid in the present invention includes an acidic compound, the pH (25° C.) of the treatment liquid is preferably 6 or less, and more preferably, the pH is 4 or less. In particular, the pH (25° C.) is preferably within a range of 1 to 4, and the pH is particularly preferably 1 to 3. At this time, the pH (25° C.) of the ink composition is preferably 7.5 or more (more preferably 8.0 or more).

In particular, from the viewpoints of image density, resolution, and high-speed ink jet recording, a case where the pH of the ink composition (25° C.) is equal to or greater than 8.0 and the pH of the treatment liquid (25° C.) is 0.5 to 4 is preferable.

In particular, an acidic compound with high water solubility is preferable as the aggregation component of the present invention, and in terms of increasing the aggregability and fixing the entirety of the ink, an organic acid is preferable, a di- or higher valent organic acid is more preferable, and a di- to tri-valent acidic compound is particularly preferable. As the di- or higher valent organic acid, an organic acid having a first pKa of 3.5 or less is preferable, and an organic acid having 3.0 or less is more preferable. Specifically, for example, phosphoric acid, oxalic acid, malonic acid, citric acid and the like may be suitably exemplified.

As the polyvalent metallic salt, salts of an alkaline earth metal which belongs to the second classification in the periodic table (for example, magnesium and calcium), a transition metal which belongs to the third classification of the periodic table (for example, lanthanum), a cation from the thirteenth classification of the periodic table (for example, aluminum), or lanthanides (for example, neodymium) may be exemplified. As the salts of these metals, carboxylic acid salt (formic acid, acetic acid, benzoic acid salt, or the like), nitric acid salt, chlorides, and thiocyanate are suitable. Among these, the following are preferable: calcium salt or magnesium salt of carboxylic acid (formic acid, acetic acid, benzoic acid salt, and the like); calcium salt or magnesium salt of nitric acid; calcium chloride; magnesium chloride; and calcium salt or magnesium salt of thiocyanic acid.

The aggregation component can be used as one type singly or as a mixture of two types or more.

The content amount of the aggregation component that aggregates the ink composition in the treatment liquid is preferably within a range of 1 to 50 mass %, more preferably within a range of 3 to 45 mass %, and even more preferably within a range of 5 to 40 mass %.

In addition to being contained in the ink composition, at least one type of polymerization initiator that initiates polymerization of the polymerizable compound in the ink composition using active energy rays may also be contained in the treatment liquid. The polymerization initiator may be used as one type alone, two types or more may be mixed, or the polymerization initiator may be used along with a sensitizer.

Similarly to the ink composition, the polymerization initiator that is used in the treatment liquid can be appropriately selected from compounds that can initiate a polymerization reaction of the polymerizable compound using active energy rays. Examples of polymerization initiators include polymerization initiators (for example, photopolymerization initiators and the like) that generate active species (radicals, acids, bases, and the like) using radiation, light, or electron beams. The details of the photopolymerization initiator and the like are as described in the paragraph relating to the ink composition.

Further, other additives may also be contained in the treatment liquid as other components within a range not impairing the effect of the present invention. Examples of these other additives include known additives such as an anti-drying agent (wetting agent), an anti-fading agent, an emulsion stabilizer, a penetration enhancer, an ultraviolet absorbing agent, a preservative, a fungicide, a pH adjusting agent, a surface tension adjusting agent, a defoaming agent, a viscosity adjusting agent, a dispersant, a dispersion stabilizer, a rust inhibitor, and a chelating agent.

<Image Forming Method>

An image forming method of the present invention is configured by providing at least an ink applying step for forming an image by applying the ink composition of the present invention described earlier to a recording medium through an ink jet method. With the image forming method of the present invention, since the ink composition described above is used, the adhesiveness of the image is excellent and recoverability after being left for a period when use is interrupted or stopped, such as in long-term storage or use in a high temperature environment, is excellent.

—Ink Applying Step—

The ink applying step applies the ink composition of the present invention described earlier to a recording medium using an ink jet method. In the present step, the ink composition can be applied selectively to the recording medium to form a desired visible image. Here, details of the ink composition such as details of the ink composition and preferable aspects thereof are as described earlier in the description relating to the ink composition.

By supplying energy, the image formation using an ink jet method ejects the ink composition described earlier onto a desired recording medium and forms a color image. Here, the method disclosed in paragraph numbers 0093 to 0105 of JP2003-306623A can be applied as a preferable ink jet method of the present invention.

There is no particular limitation on the ink jet method, and the ink jet method may be any known method such as, for example, a charge control method of ejecting ink using electrostatic induction, a drop-on-demand method (pressure pulse method) using the vibration pressure of a piezo element, an acoustic ink jet method ejecting ink using radiation pressure by changing an electrical signal into an acoustic beam and irradiating the ink, and a thermal ink jet (bubble jet (registered trademark)) method using the pressure generated when the ink is heated and bubbles are formed. As the ink jet method, in particular, using the method described in JP1979-59936A (JP-S54-59936A), an ink jet method, in which a sudden change in the volume is generated in ink subjected to the action of thermal energy and the ink is ejected from nozzles by the acting force due to the change in state, can be used effectively.

Here, the ink jet methods include a method of discharging a lot of ink having a low concentration known as photo ink at small volumes, a method of improving image quality using a plurality of inks with substantially the same color phase and different concentrations, and a method of using a colorless and transparent ink.

As the ink jet head, there is a shuttle method of using a short serial head and performing recording while scanning the head in the width direction of the recording medium, and a line method using a line head in which recording elements are arranged to correspond to the entire region of one side of the recording medium. In the line method, it is possible to perform image recording over the whole surface of the recording medium by scanning the recording medium in the direction intersecting the arrangement direction of the recording elements and a transport system for a carriage or the like scanning the short head is unnecessary. In addition, since complicated scanning control of the movement of the carriage and the recording medium is unnecessary and only the recording medium is moved, it is possible to realize an increase in the recording speed in comparison with the shuttle method. The image forming method of the present invention can be applied to either of the above; however, there is generally a large improvement effect in the ejection precision and abrasion resistance of the image in the case of application to a line method that does not use a dummy jet.

From the viewpoint of obtaining a highly detailed image, the droplet volume of the ink that is ejected from the ink jet head is preferably 1 to 10 pl (picoliters), and more preferably 1.5 to 6 pl. In addition, from the viewpoint of improving the unevenness of the image and the connection of the continuous tone, it is also effective to combine and eject different droplet amounts and the present invention can be favorably used even in these cases.

—Treatment Liquid Applying Step—

It is preferable that the image forming method of the present invention be configured to be further provided with a treatment liquid applying step of applying a treatment liquid including an aggregation component that forms an aggregation when in contact with the ink composition to a recording medium.

The treatment liquid applying step applies a treatment liquid including an aggregation component aggregates the components in the ink composition to a recording medium, and forms an image by bringing the treatment liquid into contact with the ink composition. In such a case, dispersed particles such as the solid solution pigment in the ink composition are aggregated and an image is fixed on the recording medium. Here, the treatment liquid contains at least an aggregation component, and details and preferable aspects of each component are as described earlier.

The applying of the treatment liquid can be performed by applying a known method such as a coating method, an ink jet method, or an immersion method. As the coating method, it is possible to use well-known coating methods using a bar coater, an extrusion die coater, an air doctor coater, a blade coater, a rod coater, a knife coater, a squeeze coater, a reverse roll coater, a bar coater and the like. Details of the ink jet method are as described earlier.

The treatment liquid applying step may be provided either before or after the ink applying step using the ink composition. In the present invention, an aspect in which the ink applying step is provided after applying the treatment liquid in the treatment liquid applying step is preferable. Specifically, an aspect of forming an image by applying the treatment liquid for aggregating dispersed particles such as the solid solution pigment in the ink composition in advance before the ink composition is applied to the recording medium, and applying the ink composition so as to come into contact with the treatment liquid applied to the recording medium is preferable. In this manner, high speed ink jet recording is possible, and an image with high density and resolution is obtained even with high-speed recording.

The applied amount of the treatment liquid is not particularly limited as long as the ink composition can be aggregated; however, an amount at which the applied amount of the aggregation component can be set to 0.1 $g/m^2$ or more is preferable. In particular, an amount at which the applied amount of the aggregation component is 0.2 to 0.7 $g/m^2$ is preferable. If the applied amount of the aggregation component is 0.1 $g/m^2$ or more, favorable high-speed aggregability can be maintained in accordance with various usage aspects of the ink composition. Further, it is preferable that the applied amount of the aggregation component be 0.7 $g/m^2$ or less from the viewpoint that the surface properties of the recording medium onto which the aggregation component is applied are not adversely affected (changes in gloss or the like).

Further, in the present invention, the ink applying step is provided after the treatment liquid applying step and it is preferable to further provide a heat drying step of heating and drying the treatment liquid on the recording medium after applying the treatment liquid to the recording medium and before the ink composition is applied. By heating and drying the treatment liquid in advance before the ink applying step, the ink colorability such as bleeding prevention becomes favorable, and a visible image with a favorable color density and color tone can be recorded.

The heating and drying is performed through known means for heating such as a heater, means for ventilating using ventilation such as a dryer, or means that combines the two. Examples of the heating method include a method of heating from the opposite side to the applying surface of the treatment liquid on the recording medium using a heater or the like, a method of directing warm air or hot air onto the applying surface of the treatment liquid on the recording medium, a heating method using an infrared heater, and the like, or heating may be carried out by combining a plurality of methods.

—Recording Medium—

The image forming method of the present invention is to record an image on a recording medium. The recording medium is not particularly limited; however, generic printing paper based on cellulose such as so-called high-quality paper, coated paper, and art paper which are used in general offset printing or the like can be used. In image recording using a generic ink jet method using water-based ink, generic printing paper based on cellulose absorbs and dries ink relatively slowly, the color material tends to move after the ink lands, and the image quality tends to decrease; however, using the image forming method of the present invention, color material movement is suppressed, and a high quality image with excellent color density and color tone can be recorded.

A generic, commercially available recording medium may be used, examples of which include high-quality paper (A) such as "OK Prince High Quality" manufactured by Oji Paper Co., Ltd., "Shiraoi" manufactured by Nippon Paper Industries Co., Ltd., and "New NPI High Quality" manufactured by Nippon Paper Industries Co., Ltd., fine coated paper such as "OK Ever Light Coat" manufactured by Oji Paper Co., Ltd., and "Aurora S" manufactured by Nippon Paper Industries Co., Ltd., lightweight coated paper (A3) such as "OK Coat L" manufactured by Oji Paper Co., Ltd. and "Aurora L" manufactured by Nippon Paper Industries Co., Ltd., coated paper (A2, B2) such as "OK Top Coat+" manufactured by Oji Paper Co., Ltd. and "Aurora Coat" manufactured by Nippon Paper Industries Co., Ltd., and art paper (A1) such as "OK Kinfuji+" manufactured by Oji Paper Co., Ltd. and "Tokubishi Art" manufactured by Mitsubishi Paper Mills Limited, and the like. Further, it is also possible to use a variety of types of dedicated photo paper for ink jet recording.

Among the recording media, so-called coated paper used for general offset printing and the like is preferable. Coated paper is provided with a coating layer by coating a coating material on the surface of high-quality paper, neutral paper, or the like, which are based on cellulose and generally not surface processed. In image forming using a normal aqueous ink jet, coated paper is apt to suffer problems relating to quality such as image gloss, resistance to abrasion, and the like; however, in the image forming method of the present invention, it is possible to suppress uneven gloss and obtain an image having a favorable glossiness and abrasion resistance characteristic. In particular, it is preferable to use coated paper having a coating layer including a base sheet and an inorganic pigment, and it is more preferable to use coated paper having a coated layer including a base sheet and kaolin and/or calcium bicarbonate. Specifically, art paper, coated paper, lightweight coated paper, and fine coated paper are more preferable.

Examples

Below, the present invention will be described in more detail using examples; however, the present invention is not limited to the following examples as long as it does not exceed the gist thereof. In addition, unless otherwise specified, "parts" are by mass.

<Preparation of Polymer Dispersant>

(Synthesis of Water-Insoluble Resin P-1)

88 g of methyl ethyl ketone was added to a 1000 ml three-necked flask that included a stirrer and condenser and heated in a nitrogen atmosphere to 72° C., and a solution in which 0.85 g of dimethyl-2,2'-azobisisobutyrate, 50 g of phenoxyethyl methacrylate, 13 g of methacrylic acid, and 37 g of methyl methacrylate were dissolved in 50 g of methyl ethyl ketone was added dropwise thereto over three hours. After reacting for another hour after the end of the dropwise addition, a solution in which 0.42 g of dimethyl-2,2'-azobisisobutyrate was dissolved in 2 g of methyl ethyl ketone was added, heated to and maintained at 78° C. for four hours. The obtained reaction solution was reprecipitated twice in an excess amount of hexane and the precipitated resin was dried, whereby 96.5 g of a phenoxyethyl methacrylate/methyl methacrylate/methacrylic acid (copolymer ratio [mass ratio] =50/37/13) copolymer (water-insoluble resin P-1) was obtained.

The composition of the obtained water-insoluble resin P-1 was confirmed using $^1$H-NMR, and the weight average molecular weight (Mw) determined using GPC was 49400. Further, when the acid value of the water-insoluble resin was calculated using the method prescribed in Japanese Industrial Standard (JIS K 0070:1992), the acid value was 84.8 mgKOH/g.

<Preparation Method of Quinacridone Solid Solution Pigment 1 Consisting of C.I. Pigment Violet 19 and C.I. Pigment Red 202>

After 4 parts of crude unsubstituted quinacridone, 16 parts of crude 2,9 dichloro quinacridone, and 150 parts of dimethyl sulfoxide containing 10% water were weighed into a flask, 7.5 parts of potassium hydroxide were added thereto while stirring the mixture to form a homogeneous slurry.

Thereafter, after continuing stiffing for about two hours, insoluble matter and the like present in trace amounts was removed using a filter. The obtained slurry was cooled to 0° C. and aqueous sulfuric acid in which 5 parts of sulfuric acid were diluted with 10 parts of ion exchange water was slowly added dropwise over about 5 minutes from a dropping funnel under stiffing while maintaining the temperature. After the completion of the dropwise addition, aging was performed for one hour while stirring was further continued and a sufficiently homogenous slurry form was maintained. Thereafter, the slurry viscosity was lowered by being diluted with 150 parts of water and filtering was performed using a filter. After re-dispersing and washing the obtained cake-like material in 1 L of water with a dispersing mixer, filtering was performed again. After repeating the dilution with water, filtering, and re-dispersing and washing three times, drying was performed for 12 hours with a hot air dryer at 60° C., and the target solid solution pigment 1 was obtained with a recovery rate close to an approximately fixed amount.

<Preparation method of Quinacridone Solid Solution Pigment 2 Consisting of C.I. Pigment Violet 19 and C.I. Pigment Red 122>

Based on the preparation method of the solid solution pigment 1, other than using 6 parts of crude unsubstituted quinacridone and 14 parts of crude 2,9 dimethyl quinacridone instead of 4 parts of crude unsubstituted quinacridone and 16 parts of crude 2,9 dichloro quinacridone, a solid solution pigment 2 was obtained in the same manner as the preparation method of the solid solution pigment 1.

<Preparation of Aqueous Solid Solution Pigment Dispersion>

(Preparation of Magenta Solid Solution Pigment Water-Based Dispersion A1)

11 parts of the quinacridone solid solution pigment 1 made of C.I. Pigment Violet 19 and C.I. Pigment Red 202 (C.I. Pigment Violet 19/C.I. Pigment Red 202 (mass ratio)=20/80), 5.2 parts of the polymer dispersant P-1, 20 parts of methyl ethyl ketone, 7.2 parts of 1 mol/L NaOH aqueous solution, and 56.6 parts of ion exchange water were mixed and dispersed for 6 hours using 0.1 mm φ zirconia beads using a bead mill. The methyl ethyl ketone was removed at 55° C. from the obtained dispersoid under reduced pressure and a portion of the water was also removed, whereby an aqueous dispersion of pigment-containing vinyl polymer particles was obtained.

0.75 parts of a cross-linking agent (manufactured by Nagase Chemtex Co., Ltd., trade name: Denacol EX-321; trimethylolpropane polyglycidyl ether, same applies below) and 8.25 parts of a 4 mass % aqueous solution of boric acid were added to 100 parts of the obtained aqueous dispersion of pigment-containing vinyl polymer particles and thorough stirring was performed at 70° C. for 5 hours. After 5 hours, the resultant was cooled to room temperature and a centrifugal process was performed for 30 minutes at 7000 rpm using a 50 mL centrifugal pipe using High-Speed Centrifugal Cooler 7550 (manufactured by Kubota Corporation), whereby a supernatant solution other than the precipitated matter was recovered. When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 67 nm. The pigment concentration was then determined using the light absorbance spectrum, and by adding ion-exchange water, the magenta solid solution pigment water-based dispersoid A1 in which the vinyl polymer is cross-linked was obtained as a dispersoid of resin-covered pigment particles (capsulized pigment) with a pigment concentration of 15 mass %.

(Preparation of Magenta Solid Solution Pigment Water-Based Dispersoid A2)

An aqueous dispersion of pigment-containing vinyl polymer particles was obtained in the same manner as the magenta solid solution pigment water-based dispersoid A1.

0.64 parts of a cross-linking agent (manufactured by Nagase Chemtex Co., Ltd., trade name: Denacol EX-321) and 7.03 parts of a 4 mass % aqueous solution of boric acid were added to 100 parts of the obtained aqueous dispersion of pigment-containing vinyl polymer particles and thorough stiffing was performed at 70° C. for 5 hours. After 5 hours, the resultant was cooled to room temperature and a centrifugal process was performed for 30 minutes at 7000 rpm using a 50 mL centrifugal pipe using High-Speed Centrifugal Cooler 7550 (manufactured by Kubota Corporation), whereby a supernatant solution other than the precipitated matter was recovered. When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 68 nm. The pigment concentration was then determined using the light absorbance spectrum, and by adding ion-exchange water, the magenta solid solution pigment water-based dispersoid A2 in which the vinyl polymer was cross-linked was obtained as a dispersoid of resin-covered pigment particles (capsulized pigment) with a pigment concentration of 15 mass %.

(Preparation of Magenta Solid Solution Pigment Water-Based Dispersoid A3)

An aqueous dispersion of pigment-containing vinyl polymer particles was obtained in the same manner as the magenta solid solution pigment water-based dispersoid A1.

0.4 parts of a cross-linking agent (manufactured by Nagase Chemtex Co., Ltd., trade name: Denacol EX-321) and 4.44 parts of a 4 mass % aqueous solution of boric acid were added to 100 parts of the obtained aqueous dispersion of pigment-containing vinyl polymer particles and thorough stirring was performed at 70° C. for 5 hours. After 5 hours, the resultant was cooled to room temperature and a centrifugal process was performed for 30 minutes at 7000 rpm using a 50 mL centrifugal pipe using High-Speed Centrifugal Cooler 7550 (manufactured by Kubota Corporation), whereby a supernatant solution other than the precipitated matter was recovered. When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 72 nm. The pigment concentration was then determined using the light absorbance spectrum, and by adding ion-exchange water, the magenta solid solution pigment water-based dispersoid A3 in which the vinyl polymer was cross-linked was obtained as a dispersoid of resin-covered pigment particles (capsulized pigment) with a pigment concentration of 15 mass %.

(Preparation of Magenta Solid Solution Pigment Water-Based Dispersoid A4)

13 parts of the quinacridone solid solution pigment 2 made of C.I. Pigment Violet 19 and C.I. Pigment Red 122 (C.I. Pigment Violet 19/C.I. Pigment Red 122 (mass ratio)=30/70), 5.8 parts of the polymer dispersant P-1, 20 parts of methyl ethyl ketone, 7.2 parts of 1 mol/L NaOH aqueous solution, and 54 parts of ion exchange water were mixed and dispersed for 5 hours using 0.1 mm φ zirconia beads using a bead mill. The methyl ethyl ketone was removed at 55° C. from the obtained dispersoid under reduced pressure and a portion of the water was also removed.

0.75 parts of a cross-linking agent (manufactured by Nagase Chemtex Co., Ltd., trade name: Denacol EX-321) and 8.25 parts of a 4 mass % aqueous solution of boric acid were added to 100 parts of the obtained aqueous dispersion of pigment-containing vinyl polymer particles and thorough stiffing was performed at 70° C. for 5 hours. After 5 hours, the resultant was cooled to room temperature and a centrifugal process was performed for 30 minutes at 7000 rpm using a 50 mL centrifugal pipe using High-Speed Centrifugal Cooler 7550 (manufactured by Kubota Corporation), whereby a supernatant solution other than the precipitated matter was recovered. When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 70 nm. The pigment concentration was then determined using the light absorbance spectrum, and by adding ion-exchange water, the magenta solid solution pigment water-based dispersoid A4 in which the vinyl polymer was cross-linked was obtained as a dispersoid of resin-covered pigment particles (capsulized pigment) with a pigment concentration of 15 mass %.

(Preparation of Magenta Solid Solution Pigment Water-Based Dispersoid A5): For Comparison 11 parts of the quinacridone solid solution pigment 1 made of C.I. Pigment Violet 19 and C.I. Pigment Red 202 (C.I. Pigment Violet 19/C.I. Pigment Red 202 (mass ratio)=20/80), 5.2 parts of the polymer dispersant P-1, 20 parts of methyl ethyl ketone, 7.2 parts of 1 mol/L NaOH aqueous solution, and 56.6 parts of ion exchange water were mixed and dispersed for 6 hours using 0.1 mm φ zirconia beads using a bead mill. The methyl ethyl ketone was removed at 55° C. from the obtained dispersoid under reduced pressure and a portion of the water was also removed. Thereafter, a centrifugal process was performed for 30 minutes at 7000 rpm using High-Speed Centrifugal Cooler 7550 (manufactured by Kubota Corporation) and a 50 mL centrifugal pipe, whereby a supernatant solution other than the precipitated matter was recovered. When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 75 nm. The pigment concentration was then determined using the light absorbance spectrum, and by adding ion-exchange water, the magenta solid solution pigment water-based dispersoid A5, which was not cross-linked, was obtained as a resin-covered pigment particle (capsulized pigment) dispersoid with a pigment concentration of 15 mass %.

(Preparation of Magenta Pigment Water-Based Dispersoid B1): For Comparison 11.5 parts of C.I. Pigment Violet 19 pigment, 5.2 parts of the polymer dispersant P-1, parts of methyl ethyl ketone, 7.2 parts of 1 mol/L NaOH aqueous solution, and 56.1 parts of ion exchange water were mixed and dispersed for 5 hours using 0.1 mm φ zirconia beads using a bead mill.

The methyl ethyl ketone was removed at 55° C. from the obtained dispersoid under reduced pressure and a portion of the water was also removed.

0.75 parts of a cross-linking agent (manufactured by Nagase Chemtex Co., Ltd., trade name: Denacol EX-321) and 8.25 parts of a 4 mass % aqueous solution of boric acid were added to 100 parts of the obtained aqueous dispersion of pigment-containing vinyl polymer particles and thorough stirring was performed at 70° C. for 5 hours. After 5 hours, the resultant was cooled to room temperature and a centrifugal process was performed for 30 minutes at 7000 rpm using a 50 mL centrifugal pipe using High-Speed Centrifugal Cooler 7550 (manufactured by Kubota Corporation), whereby a supernatant solution other than the precipitated matter was recovered. When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 74 nm. The pigment concentration was then determined using the light absorbance spectrum, and by adding ion-exchange water, the magenta pigment water-based dispersoid B1 was obtained as a resin-covered pigment particle (capsulized pigment) dispersoid with a pigment concentration of 15 mass %.

(Preparation of Magenta Pigment Water-Based Dispersoid B2): For Comparison 12 parts of C.I. Pigment Violet 122 pigment, 5.3 parts of the polymer dispersant P-1, 20 parts of methyl ethyl ketone, 7.2 parts of 1 mol/L NaOH aqueous solution, and 55.5 parts of ion exchange water were mixed and dispersed for 5 hours using 0.1 mm φ zirconia beads using a bead mill. The methyl ethyl ketone was removed at 55° C. from the obtained dispersoid under reduced pressure and a portion of the water was also removed.

0.75 parts of a cross-linking agent (manufactured by Nagase Chemtex Co., Ltd., trade name: Denacol EX-321) and 8.25 parts of a 4 mass % aqueous solution of boric acid were added to 100 parts of the obtained aqueous dispersion of pigment-containing vinyl polymer particles and thorough stiffing was performed at 70° C. for 5 hours. After 5 hours, the resultant was cooled to room temperature and a centrifugal process was performed for 30 minutes at 7000 rpm using a 50 mL centrifugal pipe using High-Speed Centrifugal Cooler 7550 (manufactured by Kubota Corporation), whereby a supernatant solution other than the precipitated matter was recovered. When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 71 nm. The pigment concentration was then determined using the light absorbance spectrum, and by adding ion-exchange water, the magenta pigment water-based dispersoid B2 was obtained as a resin-covered pigment particle (capsulized pigment) dispersoid with a pigment concentration of 15 mass %.

(Preparation of Magenta Pigment Water-Based Dispersoid B3): For Comparison 10.5 parts of C.I. Pigment Violet 202 (pigment), 5 parts of the polymer dispersant P-1, parts of methyl ethyl ketone, 7.2 parts of 1 mol/L NaOH aqueous solution, and 57.3 parts of ion exchange water were mixed and dispersed for 6 hours using 0.1 mm φ zirconia beads using a bead mill. The methyl ethyl ketone was removed at 55° C. from the obtained dispersoid under reduced pressure and a portion of the water was also removed.

0.75 parts of a cross-linking agent (manufactured by Nagase Chemtex Co., Ltd, trade name: Denacol EX-321) and 025 parts of a 4 mass % aqueous solution of boric acid were added to 100 parts of the obtained aqueous dispersion of pigment-containing vinyl polymer particles and thorough stirring was performed at 70° C. for 5 hours. After 5 hours, the resultant was cooled to room temperature and a centrifugal process was performed for 30 minutes at 7000 rpm using a 50 mL centrifugal pipe using High-Speed Centrifugal Cooler 7550 (manufactured by Kubota Corporation), whereby a supernatant solution other than the precipitated matter was recovered. When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd), the volume average particle diameter was 77 nm. The pigment concentration was then determined using the light absorbance spectrum, and by adding ion-exchange water, the magenta pigment water-based dispersoid B3 was obtained as a resin-covered pigment particle (capsulized pigment) dispersoid with a pigment concentration of 15 mass %.

(Preparation of Inks 1 to 10)

Using the magenta solid solution pigment water-based dispersoids A1 to A5 and B1 to B3 obtained as described above, the following polymerizable compound 1, and colloidal silica (Snowtex XS, average particle diameter 5 nm, manufactured by Nissan Chemical Industries, Ltd.), each component was mixed to create the following compositions. The compositions were filled into plastic disposable syringes and filtered through a PVDF 5 μm filter (Millex-SV, diameter 25 mm, manufactured by Millipore Corporation) to prepare inks 1 to 10

Each composition (ink compositions 1 to 10) of the inks 1 to 10 is shown below.

[Chem. 16]

Polymerizable compound 1

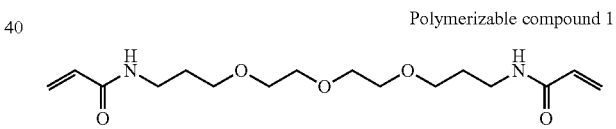

| <Ink Composition 1> | |
|---|---|
| Magenta Solid Solution Pigment Water-Based Dispersoid A1 | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 2>

| | |
|---|---|
| Magenta Solid Solution Pigment Water-Based Dispersoid A2 | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 3>

| | |
|---|---|
| Magenta Solid Solution Pigment Water-Based Dispersoid A3 | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 4>

| | |
|---|---|
| Magenta Solid Solution Pigment Water-Based Dispersoid A4 | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 5>

| | |
|---|---|
| Magenta Solid Solution Pigment Water-Based Dispersoid A1 | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 6>

| | |
|---|---|
| Magenta Pigment Water-Based Dispersoid B1 | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 7>

| | |
|---|---|
| Magenta Pigment Water-Based Dispersoid B2 | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 8>

| | |
|---|---|
| Magenta Pigment Water-Based Dispersoid B3 (PR 202) | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 9>

| | |
|---|---|
| Magenta Solid Solution Pigment Water-Based Dispersoid A5 | 20 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Ink Composition 10>

| | |
|---|---|
| Magenta Pigment Water-Based Dispersoid A1 | 25 mass % |
| Polymerizable Compound 1 | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Ion-exchange water | remainder (added to make a total of 100 mass %) |

<Preparation of Treatment Liquid>

Components having the following composition were mixed and the treatment liquid 1 was prepared. The viscosity, surface tension, and pH (25° C.) of the treatment liquid 1 were viscosity of 2.5 mPa·s, surface tension of 40 mN/m, and pH of 1.0. Here, the surface tension was measured using a fully automatic surface tensiometer CBVP-Z manufactured by Kyowa Interface Science Co., Ltd., the viscosity was measured using a DV-III Ultra CP manufactured by Brookfield Engineering Inc., and the pH was measured using a pH meter HM-30R manufactured by DKK-Toa Corporation.

<Composition of Treatment liquid 1>

| | |
|---|---|
| Malonic acid (manufactured by Wako Pure Chemical Industries, Ltd.) | 25.0 mass % |
| Diethylene glycol monomethyl ether (manufactured by Wako Pure Chemical Industries, Ltd.) | 20.0 mass % |
| Emulgen P109 (manufactured by Kao Corporation, nonionic surfactant) | 1.0 mass % |
| Ion-exchange water | 54.0 mass % |

<Image Formation and Evaluation>

An ink jet head having a silicon nozzle plate was prepared, and the obtained magenta-based ink compositions A1 to A5 and B1 to B3 were sequentially filled into a reservoir tank connected to the ink jet head. Here, a liquid-repelling film formed by using a fluorinated alkyl silane compound was provided on the surface of the silicon nozzle plate in advance.

Further, as the recording medium, a strip of paper cut to an A5 size from "OK Top Coat+" (basis weight of 104.7 g/m$^2$) manufactured by Oji Paper Co., Ltd. was used.

The strip of paper cut to an A5 size was fixed to a stage that is movable in a predetermined linear direction at 500 mm/second, and the stage temperature was maintained at 30° C. The treatment liquid 1 obtained as described above was coated on the strip of paper using a bar coater with a thickness of approximately 1.2 μm (applied amount of aggregation component: 0.5 g/m$^2$), and was dried at 50° C. for two seconds immediately after the coating. The ink jet head was then fixed and arranged so that the direction of the line head in which the nozzles were lined up (main scanning direction) was inclined at 75.7 degrees with respect to a direction that is orthogonal to the movement direction of the stage (sub-scanning direction), and a solid image was formed by ejecting ink on the entire surface of the recording medium while moving the recording medium in the sub-scanning direction at a fixed speed using a line method with the ejection conditions of an ink droplet volume of 2.8 pL, an ejection frequency of 25.5 kHz, and a resolution of 1200 dpi×1200 dpi.

After the image formation, warm air was directed from a ventilator at 120° C. and 5 m/sec to the landing surface for 15 seconds to dry the landing surface while heating from the reverse side (back side) of the ink landing surface using an infrared heater. After drying the image, ultraviolet rays (metal halide lamp manufactured by Eye Graphics Co., Ltd., maximum irradiation wavelength: 365 nm) were irradiated at an accumulated irradiation amount of 3 J/cm$^2$ to cure the image and obtain an image sample.

<Evaluation>
—1. Adhesiveness—

The obtained image sample was left for 24 hours at 23° C. in a 45% RH environment. Sellotape (registered product, LP-12, manufactured by Nichiban Co., Ltd.) with a length of 3 cm was attached to the surface of the solid image after the image sample was left, and the Sellotape (registered product) was peeled off after five seconds. The Sellotape (registered product) that was peeled off from the image sample was then observed with the naked eye and evaluated according to the following evaluation standards. Of the evaluation standards below, "D" is a level that would cause problems in actual use. The evaluation results are shown in Table 1 below.

<Evaluation Standards>
A: There is no color attached to the tape, and no deterioration of the solid image of the image sample was observed.
B: Although there was color attached to the tape, no deterioration of the solid image of the image sample was observed.
C: Color was attached to the tape, and deterioration of the solid image of the image sample was also observed.
D: Color was attached to an area of equal to or greater than one-half of the tape, and the solid image of the image sample was lost.

—2. Storage Stability—

Each prepared ink was placed and sealed in a PET container and stored for 14 days in a thermostat at 65° C. and the viscosity and spectral absorption were measured after the storage. In addition, the viscosity and spectral absorption of the inks before storage were measured using the same method. The viscosity was measured using an R100-type viscometer (manufactured by Toki Sangyo Co., Ltd.) under the conditions of 25° C. and cone rotations of 20 to 100 rpm. The spectral absorption of the ink, which was diluted 1500-fold with ultra-pure water, was measured in a quartz cell using a V-570 (manufactured by JASCO Corporation), while using ultra-pure water as a reference, and the change in absorbance near 600 nm was compared.

The obtained measurement values were indexed and the stability of the pigment-containing vinyl polymer particle aqueous dispersion was evaluated according to the following evaluation standards. The evaluation results are shown in Table 1 below.

<Evaluation Standards>
A: Both the viscosity change and the absorbance change were less than ±10% of the value before storage.
B: The value of either of the viscosity change or the absorbance change was ±10% or more of the value before storage.
C: Both the viscosity change and the absorbance change were ±10% or more of the value before storage.

—3. Maintenance Characteristic—

Using an ink jet printer which was remodeled from a GEL-JET GX5000 printer manufactured by Ricoh Company, Ltd. as the ink jet recording apparatus, each ink was ejected under the following conditions (1) to (3) in a quantity such that the ink coating amount became 5 g/m$^2$ with ejection amounts of 3.5 pL. Thereafter, after a maintenance solution loaded in the ink jet printer was applied to the nozzle surface provided with the ink jet head ejection holes by using the roller, the nozzle surface of the ink jet head was wiped with a wiping blade (hydrogenated NBR). As the maintenance solution, ones having following compositions were used.

Then, the re-ejectability was evaluated with the following method and the success or failure was determined based on the evaluation results. The evaluation of the maintenance characteristic was performed according to the following evaluation standards. The evaluation results are shown in Table 1 below.

—Re-Ejection Conditions—

(1) A case where blade wiping was performed once immediately after finishing 45 minutes of continuous ejection and the ink ejection rate thereafter was 90% or more is a pass.

(Preparation of Maintenance Solution)

By mixing and sufficiently stiffing the components in the composition shown below, a maintenance solution was prepared as a test solution for evaluating the maintenance characteristic.

| <Composition of Maintenance Solution> | |
|---|---|
| Diethylene glycol monobutyl ether (DEGmBE) | 20 mass % |
| Diethylene glycol (DEG) | 10 mass % |
| Imidazole | 0.34 mass % |
| 1N nitric acid | 0.6 mass % |
| Ion-exchange water | 69.06 mass % |

TABLE 1

| | Water-based dispersoid | | | | | | Evaluation | | | |
|---|---|---|---|---|---|---|---|---|---|---|
| | Type | Pigment | Vinyl polymer | Cross-linking (Degree of cross-linking [mol %]) | q:p [mass ratio] | Colloidal Silica | Adhesiveness | Storage Stability | Maintenance Characteristic | Remarks |
| Ink 1 | A1 | Solid solution pigment 1 | P-1 | Cross-linking (68.4) | 1:6.3 | Present | A | A | A | Present Invention |
| Ink 2 | A2 | Solid solution pigment 1 | P-1 | Cross-linking (58.2) | 1:6.3 | Present | B | A | A | Present Invention |
| Ink 3 | A3 | Solid solution pigment 1 | P-1 | Cross-linking (36.7) | 1:6.3 | Present | C | A | A | Present Invention |
| Ink 4 | A4 | Solid solution pigment 2 | P-1 | Cross-linking (61.4) | 1:6.3 | Present | A | A | B | Present Invention |
| Ink 5 | A1 | Solid solution pigment 1 | P-1 | Cross-linking (68.4) | 1:6.3 | — | B | A | A | Present Invention |
| Ink 6 | B1 | PV19 | P-1 | Cross-linking (68.4) | 1:6.3 | Present | C | B | D | Comparison |
| Ink 7 | B2 | PV122 | P-1 | Cross-linking (67.5) | 1:6.3 | Present | C | B | D | Comparison |
| Ink 8 | B3 | PV202 | P-1 | Cross-linking (71.1) | 1:6.3 | Present | D | C | D | Comparison |
| Ink 9 | A5 | Solid solution pigment 1 | P-1 | No cross-linking | 1:6.3 | Present | D | C | C | Comparison |
| Ink 10 | A1 | Solid solution pigment 1 | P-1 | Cross-linking (68.4) | 1:5.1 | Present | A | A | A | Present Invention |

(2) A case where blade wiping was performed once after a pause of 30 minutes following 1 minute of ejection and the ink ejection rate thereafter was 90% or more is a pass.
(3) A case where blade wiping was performed once immediately after finishing 10 minutes of ejection and image unevenness was not seen in the formed image thereafter is a pass.

—Evaluation Standards—

A: Three items passed
B: Two items passed
C: Only one item passed
D: All three items failed —Measurement of Ink Ejection Rate—

It was confirmed that all the nozzles were ejecting at the start of the experiment, the number of ejection nozzles after finishing the experiment including maintenance was counted, and the ejection rate was calculated from the following formula.

Ejection rate (%)={[number of ejection nozzles after maintenance]/[total nozzle number]}×100

In Table 1 above, the calculation of the degree of cross-linking of the cross-linked particles in the solid solution pigment water-based dispersoid (mol %) was performed according to the following formula. Here, the "number of moles of the reactive group of the cross-linking agent" in the formula is a value in which the mass of the cross-linking agent to be used is divided by the equivalent weight of epoxy.

Degree of cross-linking (mol %)=[number of moles of the reactive group of the cross-linking agent× 100/number of moles of reactive group capable of reacting with cross-linking agent belonging to polymer]

As shown in Table 1 above, in the present invention, by selectively using cross-linked solid solution pigments as pigments (colorants), along with excellent adhesion of the image, the stability over time of the ink composition itself was excellent.

In contrast, with the compositions for comparison which used a pigment which did not undergo solid-solutioning, the curability was insufficient and sufficient adhesion was not obtained. Further, the maintenance characteristic was also inferior. Further, with the compositions for comparison which used a solid solution pigment but for which cross-linking was not performed, the adhesion was remarkably deteriorated, and the stability over time of the ink composition itself and the maintenance characteristic were insufficient.

This application claims priority under 35 U.S.C. §119 of Japanese Patent application JP 2011-189991, filed on Aug. 31, 2011, the entire contents of which are hereby incorporated by reference.

What is claimed is:

1. An ink composition comprising:
   cross-linked particles in which at least a part of a quinacridone solid solution pigment including at least two types of quinacridone-based compound is coated with a cross-linked resin;
   a water-soluble polymerizable compound;
   a polymerization initiator; and
   water,
   wherein the ratio of the cross-linked particles (q) and the polymerizable compound (p) [q:p[mass ratio]] is 1:1 to 1:20.

2. The ink composition according to claim 1,
   wherein the quinacridone solid solution pigment is at least one of a solid solution pigment of unsubstituted quinacridone and dimethyl-substituted quinacridone, and a solid solution pigment of unsubstituted quinacridone and dichloro-substituted quinacridone.

3. The ink composition according to claim 2,
   wherein the polymerizable compound is represented by the following general formula (1):

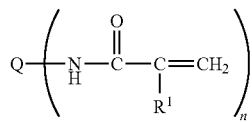

General formula (1)

wherein in general formula (1), Q represents an n valent group and $R^1$ represents a hydrogen atom or a methyl group, n represents an integer of 1 or more.

4. The ink composition according to claim 1,
   wherein the polymerizable compound is represented by the following general formula (1):

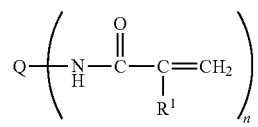

General formula (1)

wherein in general formula (I), Q represents an n valent group and $R^1$ represents a hydrogen atom or a methyl group, n represents an integer of 1 or more.

5. The ink composition according to claim 1,
   wherein the ratio of the cross-linked particles (q) and the polymerizable compound (p) [q:p[mass ratio]] is 1:5.1 to 1:20.

6. An ink set comprising:
   the ink composition of claim 1; and
   a treatment liquid including an aggregation component causing the ink composition to aggregate when in contact with the ink composition.

7. The ink set according to claim 6,
   wherein the aggregation component is an acidic compound.

8. An image forming method comprising:
   applying an ink for forming an image by applying the ink composition of claim 1 to a recording medium through an ink jet method.

9. The image forming method according to claim 8, further comprising:
   applying a treatment liquid including an aggregation component causing the ink composition to aggregate when in contact with the ink composition, to the recording medium.

10. An ink composition comprising:
    cross-linked particles in which at least a part of a quinacridone solid solution pigment including at least two types of quinacridone-based compound is coated with a cross-linked resin;
    a water-soluble polymerizable compound;
    a polymerization initiator; and
    water,
    wherein the cross-linked resin is a resin which is formed by a polymer cross-linked with a cross-linking agent.

11. The ink composition according to claim 10,
    wherein the cross-linking agent is a compound having two or more reactive functional groups in the molecule.

* * * * *